United States Patent

Andrews et al.

[11] Patent Number: 5,835,723
[45] Date of Patent: Nov. 10, 1998

[54] DYNAMIC ASSIGNMENT OF MULTICAST ADDRESSES

[75] Inventors: Michael Andrews; Gunner Danneels, both of Beaverton; Ketan Sampat; Eric Davison, both of Portland, all of Oreg.

[73] Assignee: Intel Corporation, Santa Clara, Calif.

[21] Appl. No.: 579,725

[22] Filed: Dec. 28, 1995

[51] Int. Cl.[6] .................................................. G06F 15/00
[52] U.S. Cl. ............................ 395/200.56; 395/200.69; 370/252
[58] Field of Search ........................ 395/200.1, 200.11, 395/200.12, 200.16, 200.3, 200.69, 200.54, 200.56, 200.57; 370/252, 443, 453, 462; 340/825.5, 825.52, 825.53

[56] References Cited

U.S. PATENT DOCUMENTS

| | | | |
|---|---|---|---|
| 5,150,464 | 9/1992 | Sidnu et al. | 395/200.1 |
| 5,243,596 | 9/1993 | Port et al. | 370/231 |
| 5,283,571 | 2/1994 | Yang et al. | 340/825.52 |
| 5,327,534 | 7/1994 | Hutchison et al. | 395/200.1 |
| 5,524,253 | 6/1996 | Pham et al. | 395/800 |
| 5,526,489 | 6/1996 | Nilakantan et al. | 395/200.02 |
| 5,557,748 | 9/1996 | Norris | 395/200.1 |
| 5,581,478 | 12/1996 | Cruse et al. | 364/505 |

*Primary Examiner*—Parshotam S. Lall
*Assistant Examiner*—Zarni Maung
*Attorney, Agent, or Firm*—William H. Murray, Esq.

[57] ABSTRACT

A distributed protocol for allocation of multicast addresses. A first node of a network sends an address request message identifying (1) a requested in multicast address, and (2) a multicast group identifier to which the requestor belongs. The request is in multicast on a network address reserved for address resolution. All other nodes of the network monitor the reserved network address for address request messages. If a second node receiving the address request message has already allocated the requested multicast address, then the second node sends an acknowledgment message identifying (1) the already allocated in multicast address, and (2) the multicast group for which the address has been allocated. This acknowledgment is transmitted on the same reserved network address on which the address request was sent. The first node, monitoring the reserved network address, receives the acknowledgment message. If the multicast group identified in the acknowledgment message matches the multicast group to which the first node belongs, then the first node also allocates the requested network address. If the multicast group identified in the acknowledgment message does not match the multicast group to which the first node belongs, then the first node abandons the requested network address. If the first node does not receive an acknowledgment message in response to any number of address request messages repeated for the same requested multicast address, then the first node either (1) allocates the requested network address, or (2) abandons the requested network address, if the node is not the first member of a multicast group to request allocation of the address. If address allocation succeeds, then the first node uses the allocated network address for multicasting. If address allocation fails, then the first node is free to select a different multicast address to request.

36 Claims, 16 Drawing Sheets

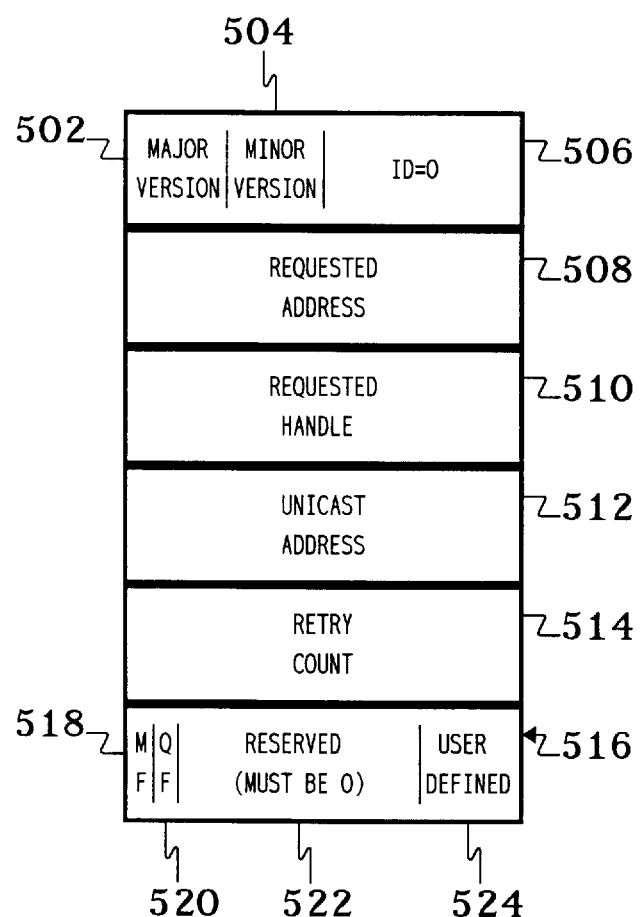
FIG. 5. ADDRESS REQUEST

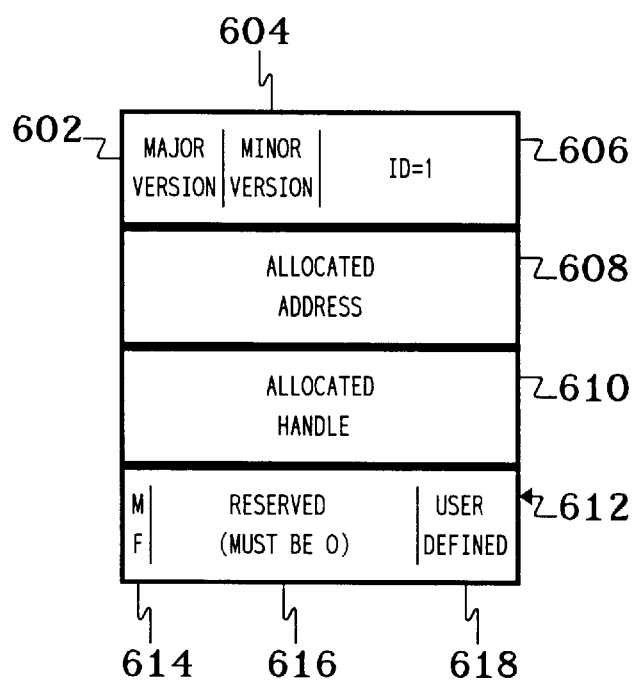
FIG. 6. ACKNOWLEDGMENT

FIG. 7. ADDRESS FORMAT
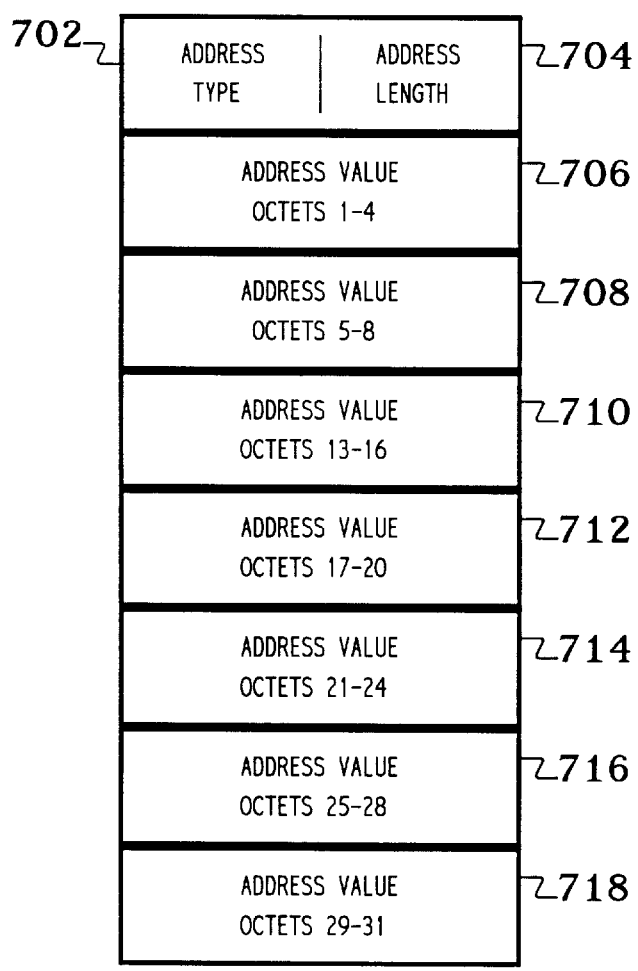

FIG. 8. HANDLE FORMAT
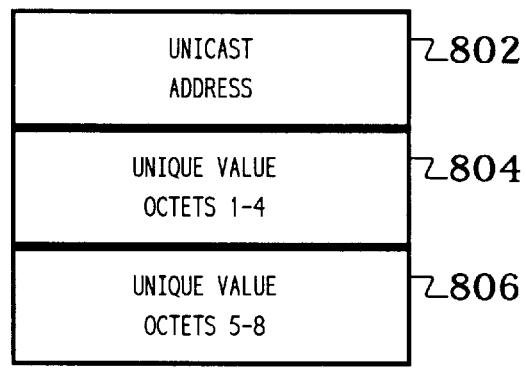

FIG. 9. MASTER GET
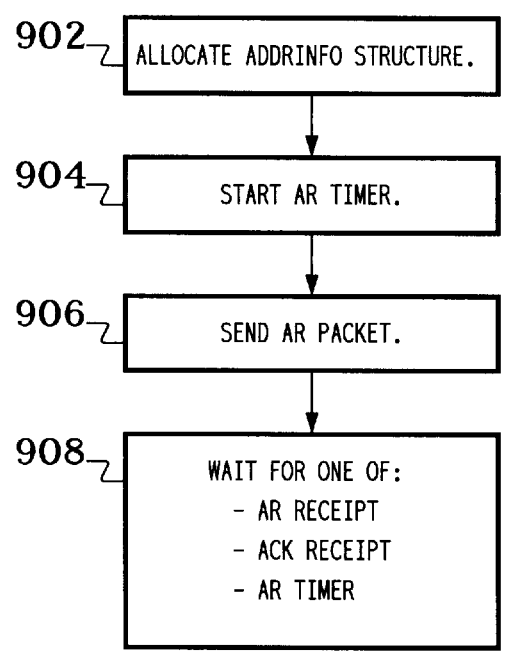

FIG. 10.   SLAVE GET
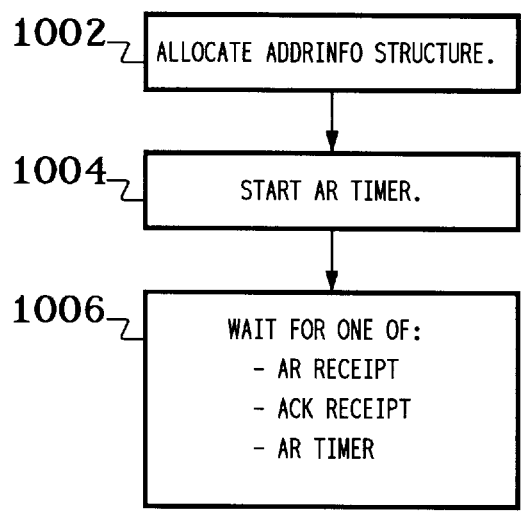

FIG. 11. ADDRESS QUERY
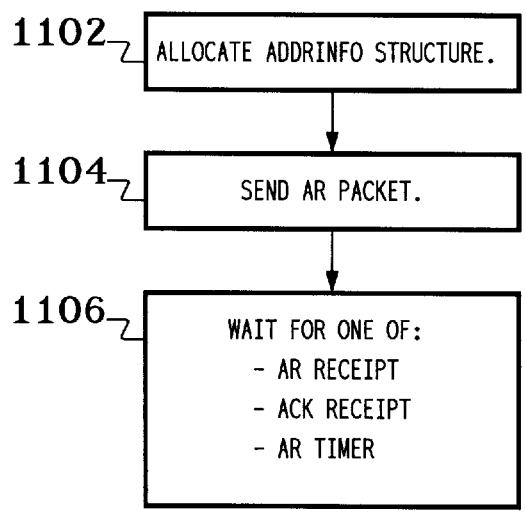

FIG. 12.   ADDRESS RELEASE
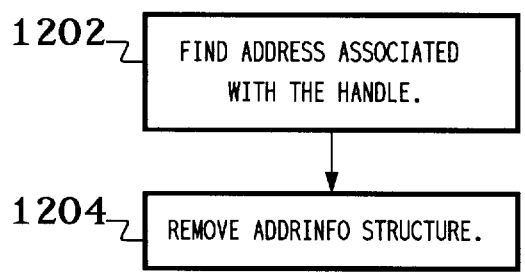

FIG. 13. ACK TIMER
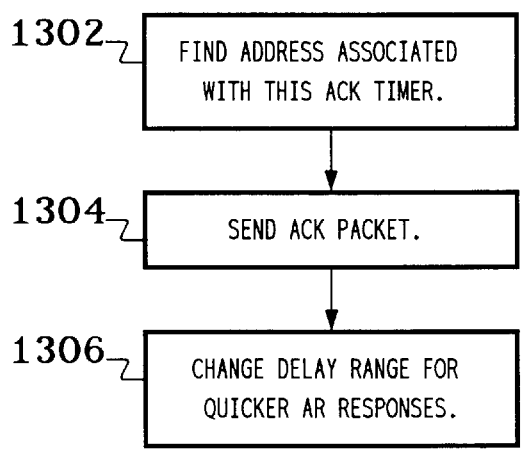

FIG. 14. AR TIMER
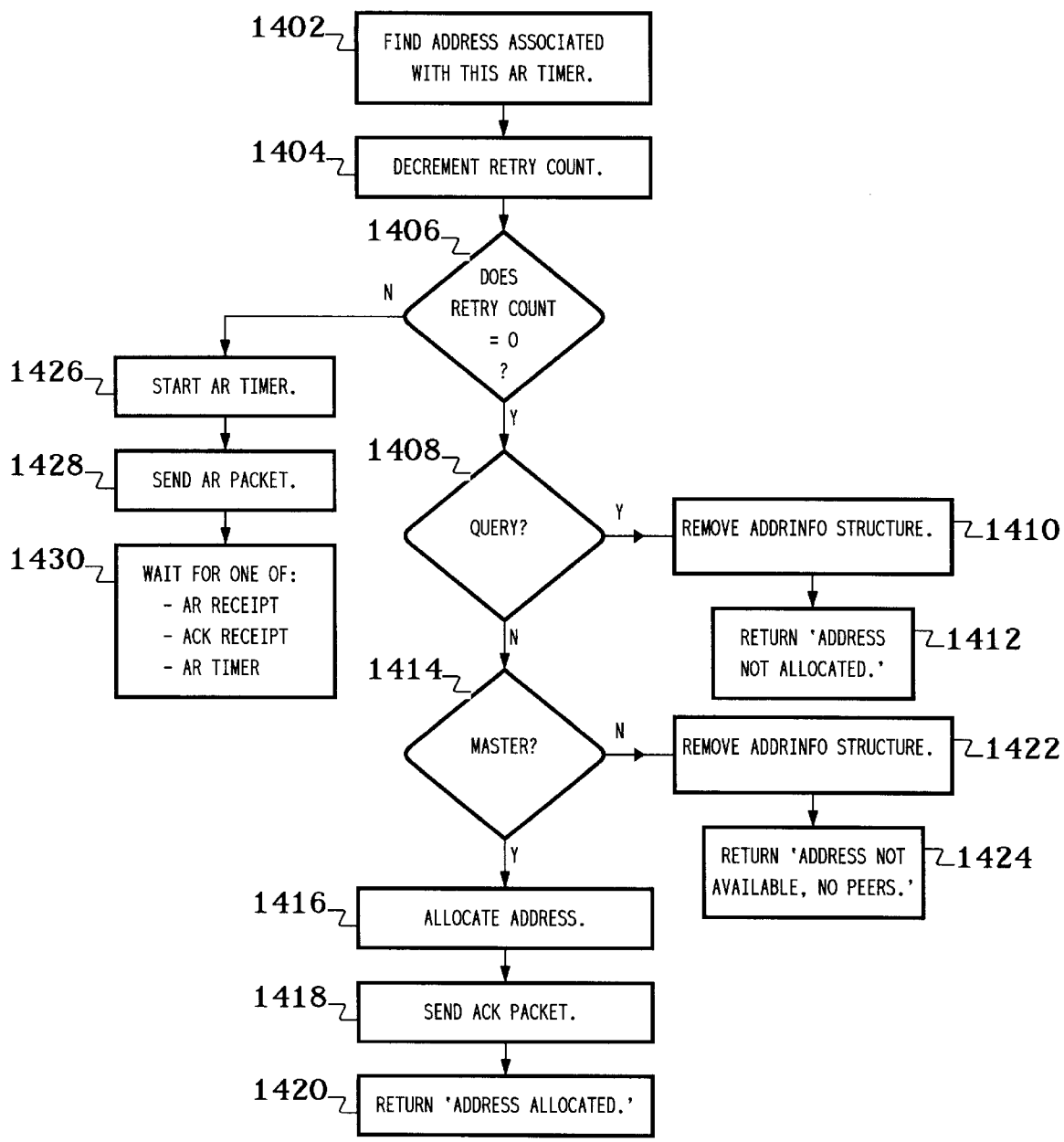

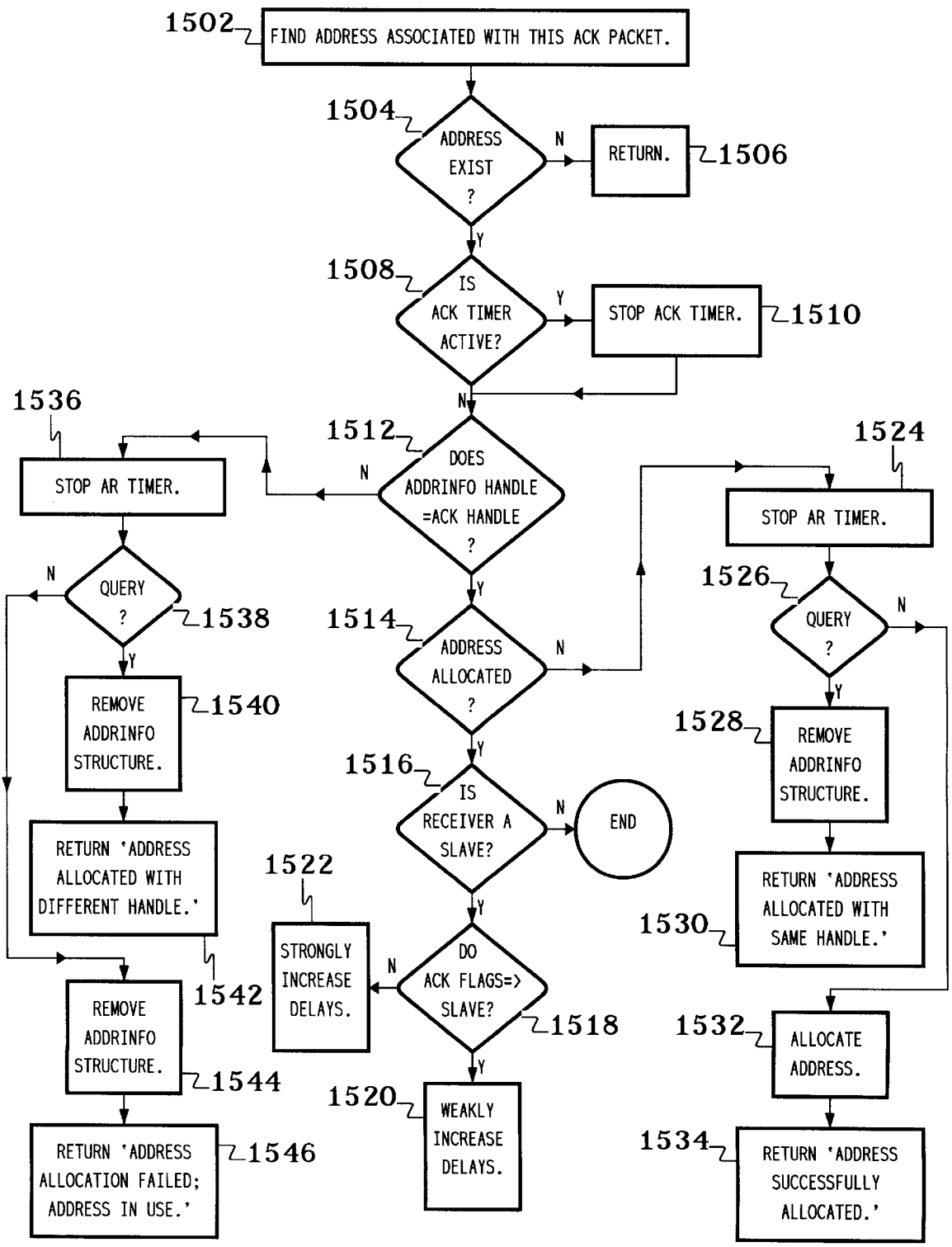

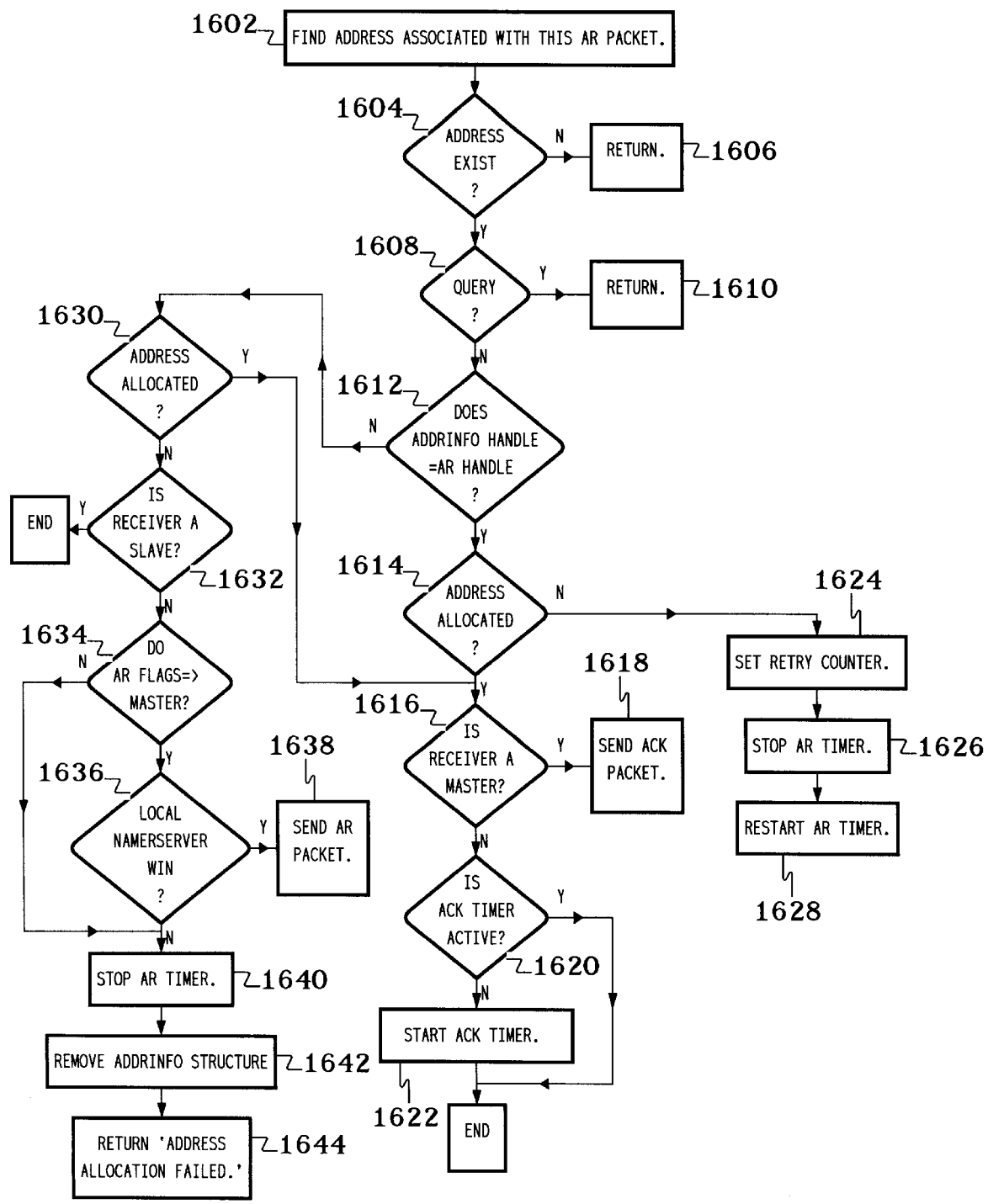
FIG. 16. AR RECEIPT

DYNAMIC ASSIGNMENT OF MULTICAST ADDRESSES

RELATED APPLICATIONS

This nonprovisional U.S. national application, filed under 35 U.S.C. § 111(a), claims, under 35 U.S.C. § 119(e)(1), the benefit of the filing date of provisional U.S. national application, Ser. No. 60/005,730 filed under 35 U.S.C. § 111(b) on Oct. 20, 1995. This application is related to U.S. patent application Ser. No. 08/636,894, filed Apr. 24, 1996, now abandoned, which is a continuation of U.S. patent application Ser. No. 08/133,615, filed Oct. 12, 1993, now abandoned, the teachings of which are incorporated herein by reference.

BACKGROUND OF THE INVENTION

1. Field of the Invention

The present invention relates to computers, and, in particular, to multicasting over computer networks.

2. Description of the Related Art

In the multicast communication area, each host on a network running the Internet Protocol (IP) is assigned an IP address which is unique throughout the scope of the network with which the host can communicate. Such binding of hosts with IP addresses may occur statically, when a network administrator assigns IP addresses selected from a pool of addresses allowed for that organization. IP address binding may also occur dynamically, generally during the host bootstrap process, when the host requests an IP address from an address server. Two protocols commonly used to effect dynamic binding are the Dynamic Host Configuration Protocol (DHCP) and the Reverse Address Resolution Protocol (RARP). Regardless of the binding method employed, if a host is connected to the global Internet, the address selected for the host must come from a pool of IP addresses reserved for that organization by the Internet Standards Institute. Since organizations are never assigned overlapping IP address pools, it is a relatively simple matter for an organization to assign a globally unique IP address to each host.

In the multicast communication area, there are no standard methods for assigning multicast IP addresses to hosts. There are significant differences between unicast and multicast address usage that preclude the use of DHCP or RARP for multicast address allocation. The Internet Request for Comments 1458 defines a method for allocation of multicast addresses based on the model provided by the Internet Domain Name Server (DNS). The proposed model has several drawbacks: it requires multiple dedicated servers; the model is susceptible to single-point failure; and the model requires that each host know the IP address of an address server.

It is accordingly an object of this invention to overcome the disadvantages and drawbacks of the known art and to provide a scheme wherein a group of related applications residing on different hosts can transiently obtain and reserve for their exclusive use a unique multicast IP address.

Further objects and advantages of this invention will become apparent from the detailed description of a preferred embodiment which follows.

SUMMARY OF THE INVENTION

The present invention comprises computer-implemented processes, apparatuses, and storage mediums encoded with machine-readable computer program code for allocating multicast addresses. According to a preferred embodiment, a potential multicast address is selected by a first node of a network operating in a Master allocation mode. An address request message is transmitted by the first node on a reserved address of the network, wherein the address request message identifies both the potential multicast address as a requested multicast address and a unique multicast address usage ID associated with the address request; one or more other nodes of the network monitor the reserved address for address request messages; at least one other node of the network transmits an acknowledgment message on the reserved address, if the requested multicast address is already allocated on the replying node; and the acknowledgment message identifies the requested multicast address as being already allocated; and the acknowledgment message identifies the multicast usage ID for which the specified multicast address is allocated. The first node monitors the reserved address for an acknowledgment message. The first node abandons the requested multicast address, if the first node receives an acknowledgment message wherein the multicast address requested by the first node matches the multicast address specified as an allocated multicast address in the acknowledgment. The first node allocates the requested multicast address as an allocated multicast address and performs multicast operations using the allocated multicast address, if the first node does not receive an acknowledgment message wherein the multicast address requested by the first node matches the multicast address specified as an allocated multicast address in the acknowledgment message.

According to another preferred embodiment, a potential multicast address is selected by a first node of a network operating in a Slave allocation mode. An address request message is transmitted by the first node on a reserved address of the network, wherein the address request message identifies both the potential multicast address as a requested multicast address and a multicast address usage ID associated with the address request; one or more nodes of the network monitor the reserved address for address request messages; at least one other node of the network transmits an acknowledgment message on the reserved address, if the requested multicast address is already allocated on the replying node; and the acknowledgment message identifies the requested multicast address as being already allocated; and the acknowledgment message identifies the multicast usage ID for which the specified multicast address is allocated. The first node monitors the reserved address for an acknowledgment message. The first node allocates the requested multicast address as an allocated multicast address and performs multicast operations using the allocated multicast address, if the first node receives an acknowledgment wherein (1) the multicast address requested by the first node matches the multicast address specified as an allocated multicast address in the acknowledgment message, and (2) the multicast usage ID specified by the first node matches the multicast usage ID specified by the acknowledgment message as the usage It) for which the specified multicast address is allocated. The first node abandons the requested multicast address, if the first node receives an acknowledgment message wherein (1) the multicast address requested by the first node matches the multicast address specified as an allocated multicast address in the acknowledgment message, and (2) the multicast usage ID specified by the first node does not match the multicast usage ID specified by the acknowledgment message as the usage ID for which the specified multicast address is allocated. The first node also abandons the requested multicast address, if the first node does not receive an acknowledgment message wherein the multicast address requested by the first node matches the multicast address specified as an allocated multicast address in the acknowledgment message.

According to another preferred embodiment, a first node of a network allocates a multicast address by a first node of a network. The first node monitors a reserved address of the network for address request messages. The first node receives an address request message on the reserved address from an other node of the network, wherein the address request message identifies a requested multicast address. The first node transmits an acknowledgment message on the reserved address, if the requested multicast address is the allocated multicast address, wherein the acknowledgment message identifies the requested multicast address as an already allocated multicast address, and the acknowledgment message identifies the multicast usage ID for which the specified multicast address is allocated; and no single node of the network is responsible for allocating multicast addresses for all other nodes.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 5 shows the structure of an address request (AR) packet, according to a preferred embodiment of the present invention;

FIG. 6 shows the structure of an acknowledgment (ACK) packet, according to a preferred embodiment of the present invention;

FIG. 7 shows the address format used in the AR packet of FIG. 5 and the ACK packet of FIG. 6;

FIG. 8 shows the handle format used in the AR packet of FIG. 5 and the ACK packet of FIG. 6;

FIG. 9 is a flow diagram of the processing for a Master Get operation, according to a preferred embodiment of the present invention;

FIG. 10 is a flow diagram of the processing for a Slave Get operation, according to a preferred embodiment of the present invention;

FIG. 11 is a flow diagram of the processing for an Address Query operation, according to a preferred embodiment of the present invention;

FIG. 12 is a flow diagram of the processing for an Address Release operation, according to a preferred embodiment of the present invention;

FIG. 13 is a flow diagram of the processing for an ACK Timer operation, according to a preferred embodiment of the present invention;

FIG. 14 is a flow diagram of the processing for an AR Timer operation, according to a preferred embodiment of the present invention;

FIG. 15 is a flow diagram of the processing for an ACK Receipt operation, according to a preferred embodiment of the present invention; and FIG. 16 is a flow diagram of the processing for an AR Receipt operation, according to a preferred embodiment of the present invention.

DESCRIPTION OF THE PREFERRED EMBODIMENT(S)

The present invention is directed to the dynamic assignment of multicast addresses. Under the present invention, a multicast address is dynamically assigned when a transmitter application requests it. In addition, the present invention does not require a dedicated multicast address server (i.e., a node dedicated to distributing multicast addresses when transmitter applications request them). This allows a more efficient use of resources and avoids the problem of reduced or non-existent facilities when a multicast address server is temporarily off line.

The transport protocol UDP is most commonly used to access the facilities of IP multicast. UDP addresses consist of an IP address and a 16-bit value specifying a UDP port multiplexed on that IP address. Therefore, a multicast UDP address can be represented as an ordered pair (A, P), where A is the IP multicast address and P is the UDP port. The present invention can also be implemented under other transport protocols.

Figure 1:
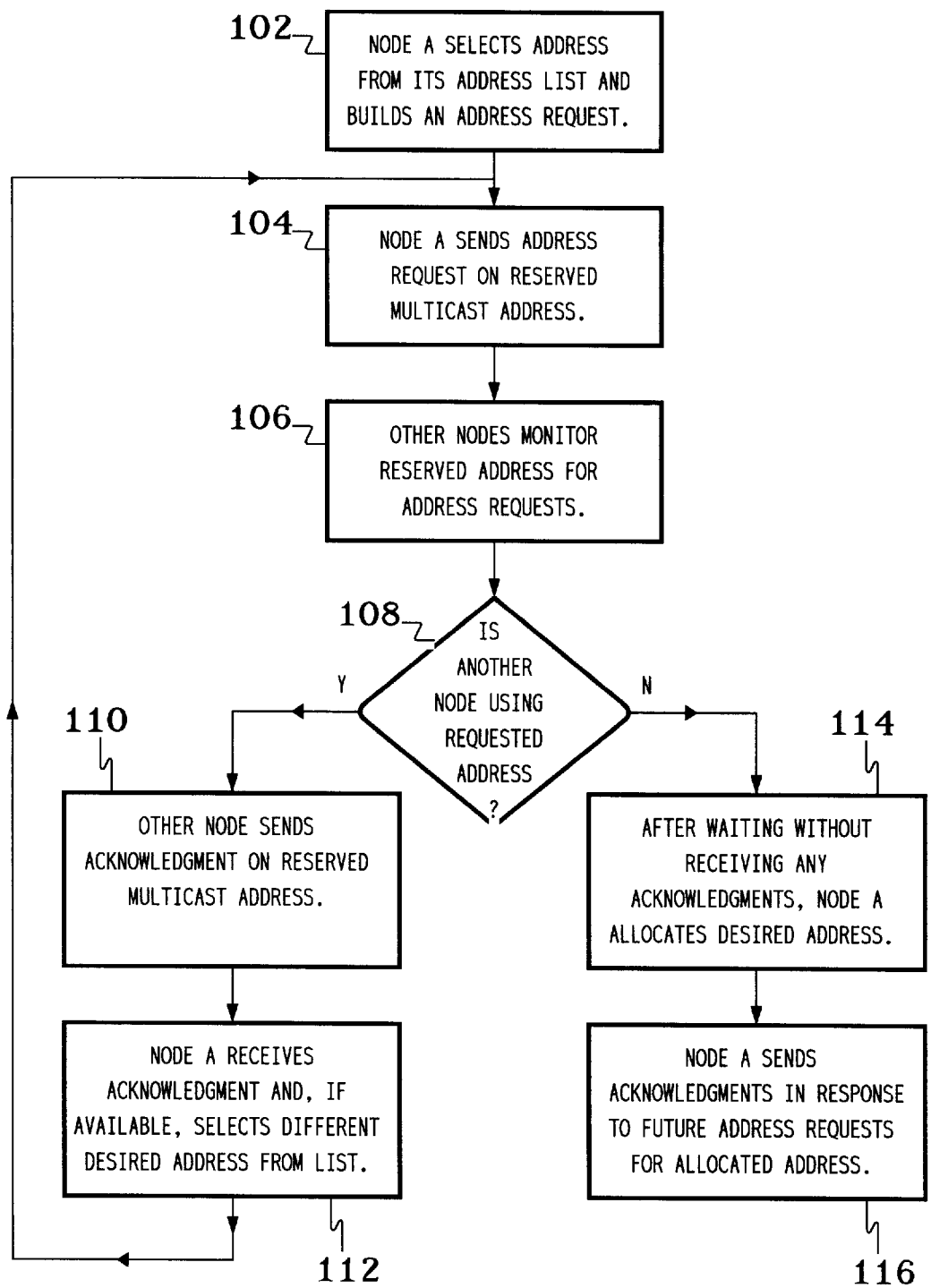
FIG. 1 is a flow diagram of multicast address allocation processing, according to a preferred embodiment of the invention.

Referring now to FIG. 1, there is shown a flow diagram of multicast address allocation processing, according to a preferred embodiment of the present invention. A multicast UDP address ($A_R$, $P_R$) called the resolution address is reserved for address resolution. Every node on the network is pre-configured with a table of possible multicast addresses on which it can operate. This table is the set of addresses which are reserved for this application and corresponds to all of the addresses that can simultaneously be in use by application sessions around the network. When a node wishes to use one of the possible addresses (step 102 of FIG. 1), it builds an address request message and sends it on the resolution multicast UDP address ($A_R$, $P_R$) (step 104). This address request message contains the multicast address which the node is requesting and the node's unique unicast address.

All nodes connected to the network monitor the address ($A_R$, $P_R$) (step 106). If a node receives an address request message for an address that it is currently using (step 108), it builds an acknowledgment packet (ACK) and transmits it on ($A_R$, $P_R$) (step 110).

When a node, requesting the use of an address, receives an ACK packet whose allocated address matches the node's requested address, it abandons the address which caused the ACK and proceeds to try the next address in its table of possible addresses (step 112). Eventually, either the table will be exhausted or there will be an address on which no other node generates an ACK. If the table is exhausted, then the node is not able to start its multicast presentation since all resolution addresses are in use.

If the node finds an address for which it does not receive an ACK, it begins to use that address (step 114) and in the future responds with an ACK to any address request messages for this address (step 116).

Effects of Packet Loss

Since, in this embodiment, the transport is UDP, packets may be lost during the address reservation protocol. The requesting node should not assume that the requested address is available whether either its address request message or a resulting ACK has been lost on the network. Since there is no way to determine positively that a message has been lost, the requesting node preferably repeats the process of FIG. 1 until there is a statistically low probability that the lack of response from other elements on the network is due to packet loss. For example, if there is a 0.5% chance that any packet is lost on the network, there is about a 1% chance that either the address request message or a resulting ACK was lost on the network. Repeating the address request 5 times and requiring that each of the 5 attempts do not generate an ACK would give a $10^{-10}$ chance that each of the requests succeeded because of a packet loss.

Effects of Propagation Time

Up to this point in the discussion, no mention has been made of the propagation time of packets around the network. It has been assumed that a node can determine when it is free to use an address because it has not seen an ACK from a competing node. A node waits to receive ACKs. It waits for its address request message to propagate around the network and for any ACKs to propagate back to it. Therefore, when a node requests an address, it sets a timer. When the timer expires without an ACK, the node assumes that there are no address conflicts and records a successful attempt. This timer is preferably set to the following value:

$$T_S + 2D_{max} + T_{ACK},$$

where $T_S$ is the duration from when a send operation is invoked until the appearance of the IP packet on the network, $D_{max}$ is the maximum propagation time around the network, and $T_{ACK}$ is the duration from when a request arrives at a node until an ACK is generated for an unavailable address. For most reasonably loaded hosts, the timer is dominated by the value $2D_{max}$. Since this process only occurs once when a node comes onto the network, a conservative estimate of the waiting time is preferably used.

Any extra waiting time in the value slows down only the node initialization.

Multicast Nameserver Protocol

According to a preferred embodiment, the present invention is directed to an architecture and protocol for a multicast address allocation server. The scheme employs a distributed "nameserver" architecture, and defines a multicast nameserver (MCNS) protocol that specifies the manner in which nameservers interact with one another. A nameserver is any node that supports the MCNS protocol. A nameserver can be a multicast transmitter or a multicast client/receiver or both. The MCNS protocol is designed to support allocation of multicast addresses at any network layer on which multicasting itself is supported (e.g., IP, Ethernet MAC). The protocol is designed to use a minimal amount of network bandwidth, while the distributed architecture allows a network administrator to configure nameservers to achieve high levels of fault tolerance.

The distributed architecture has several interesting properties. First, the extent of distribution is easily configured by simply adding or removing, individual nameserver instantiations without the need to re-configure any existing nameservers. Second, the nameserver may be deployed on a network without dedicating a particular box to nameserver functionality (i.e., a nameserver can co-exist on the same computer as its client). Third, the nameserver distribution provides some degree of fault tolerance in the event that some nodes performing nameserver functions crash or routers become overloaded. Fourth, network administrators may employ address scoping in conjunction with nameserver deployment to allow for re-use of multicast addresses among unrelated groups of applications.

Multicast address nameservers communicate using the MCNS protocol. The MCNS protocol itself has several interesting properties. First, it can support allocation of multicast addresses on any network protocol which supports multicasting (e.g., it supports allocation of both MAC-level and UDP/IP-level multicast addresses). Second, it requires minimal network bandwidth usage. Third, it requires that connections between routers be kept open only during that time when address allocation attempts are taking place. Minimizing network bandwidth usage is achieved by (1) designing the MCNS protocol so that a minimum number of nameservers issue network packets during allocation attempts, and (2) by designing these packets to convey a large amount of information in a relatively few number of bytes. The feature that connections between routers be maintained only while address allocation is being performed is advantageous in cases where it is expensive to keep connections open between routers (e.g., connections based on dial-up lines).

Multicast Nameserver Architecture

The multicast address nameserver employs a distributed architecture, wherein instantiations of the nameserver may simultaneously execute on any number of nodes on a network. The architecture is designed for use on networks connected by a relatively few number of routers, but allows for tuning to permit operation over a larger number of routers. For brevity, each instantiation of a multicast address nameserver will simply be referred to as a "nameserver" in this specification, even though the nameserving functionality is technically distributed across multiple instantiations. A network administrator may choose to distribute the nameservers in any desirable configuration, including placing a single nameserver on one wide area network (which may span multiple LANs), placing a single nameserver on each LAN (which may span multiple subnets), placing a nameserver on each subnet, or placing multiple nameservers on each subnet (including the placement of a nameserver on each node on the subnet). As will be explained later, a greater degree of distribution gives the nameserver protocol a greater degree of fault tolerance.

Each nameserver maintains a table of multicast addresses which it has allocated, or is attempting to allocate. Nameservers do not keep track of any addresses allocated by other nameservers. When a nameserver wishes to allocate an address on behalf of a client request, it interacts with other nameservers using the MCNS protocol to find an address which is currently unallocated. If successful, it adds the address to its locally maintained table.

Multicast Nameserver Communication

Nameservers communicate with one another over one or more dedicated multicast addresses and ports, using unreliable datagrams. Key datagrams are sent multiple times to reduce the probability of allocation information being lost.

The MCNS protocol supports allocation of multicast addresses on protocols at any network layer which supports multicast. In the single resolution address model described now, a single resolution multicast address $A_R$ is reserved on each supported network protocol for nameserver communication. For those network protocols which Support ports, a single resolution port $P_R$ is used on $A_R$. Note that some network protocols, such as Ethernet and token ring MAC, do not support ports.

For each network protocol supported, multicast nameservers conduct all communication over the single resolution multicast address $A_R$ (and $P_R$, if applicable) reserved for that network protocol. A particular nameserver may simultaneously support multiple network protocols, in which case it communicates over each of the resolution addresses (one per protocol). Note that the "single resolution address" model means that only one resolution address per protocol is used. Nameservers do not use unicast addresses to communicate with each other. When allocating an address, nameservers run the MCNS protocol using the same network protocol on which they are attempting to allocate the address. For example, if a single nameserver simultaneously supports both UDP/IP and Ethernet MAC, then requests for UDP/IP multicast address allocation result in the MCNS protocol being run on UDP/IP, using UDP/IP resolution $A_R$ and $P_R$. Similarly, requests for Ethernet MAC multicast addresses result in the nameserver running the MCNS protocol at the Ethernet MAC level on the Ethernet MAC resolution $A_R$.

Confining all nameserver communication on each network protocol to a single multicast address has two implications. First, nameservers do not need to maintain tables of pointers to other nameservers. This allows administrators to add or remove nameservers from a network without requiring any reconfiguration of existing nameservers. Second, nameserver communication across subnets may be limited by the multicast forwarding policy or capability of intervening routers. If the MCNS protocol packets sent on the multicast resolution address $A_R$ are not forwarded across a particular router, nameservers on either side of Such a router will be unable to communicate using the MCNS protocol. This in turn has two implications.

First, two nameservers on either side of such a router may unintentionally allocate the same multicast address, since the two nameservers are unable to communicate. This means that nameservers on either side of such a router must never allocate multicast addresses whose packets are forwarded across this router. Second, a network administrator may implement scoped address allocation by specifically configuring certain routers to forward packets sent on the resolution address $A_R$, while configuring other routers to deny forwarding of packets on $A_R$. This will create groups of nameservers, wherein inter-group nameserver communication occurs, and intra-group nameserver communication is prevented. Each group of nameservers may then be configured to allocate only multicast addresses whose packets are not forwarded beyond the group boundary. Scoped addresses are discussed in more detail in the following section.

Multicast nameservers may also be configured to support a multiple resolution address model, wherein nameservers communicate over multiple resolution addresses $A_{R1} \ldots A_{Rn}$ on a given network protocol. If a nameserver wishes to allocate a multicast address, it initiates the MCNS protocol over one of these resolution addresses (as determined either via the client request, or by some configuration table). When other nameservers observe initiation of the MCNS protocol over a particular resolution address $A_{Ri}$, they will generate appropriate responses only over the same resolution address $A_{Ri}$.

Scoped Address Allocation

The scope of a particular multicast address may be defined as the collection of all nodes which can be reached on that multicast address from a member of the scope. Address scopes are normally controlled by routers, which can be configured to allow forwarding of packets destined for only select multicast addresses. Note that if a particular multicast address is not forwarded across a particular router, that address will have (at least) two disjoint scopes, one on either side of that router.

Figure 2:
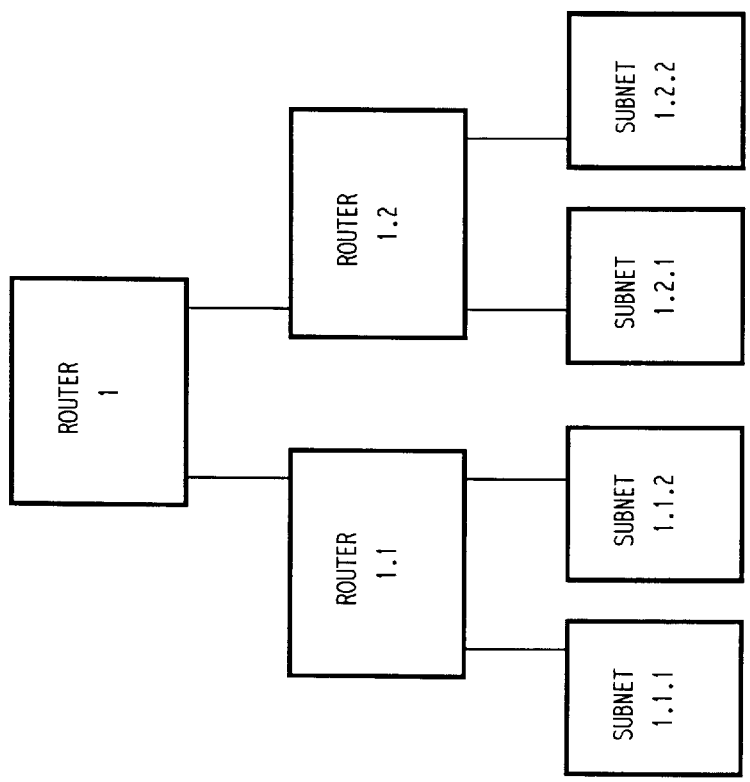
FIG. 2 is a block diagram of a particular distributed computer network, according to a preferred embodiment of the present invention.

Referring now to FIG. 2, there is shown a block diagram of a particular distributed computer network, according to a preferred embodiment of the present invention. The multiple resolution address model allows multiple hierarchical levels of address scoping. For example, assume that, in FIG. 2, each router forwards multicast addresses as follows, where "$A_R$" indicates a nameserver resolution address, and "A" indicates an address allocated by a nameserver on behalf of a client:

Router 1 forwards $A_{R1}$ and $A_1$ between router 1.1 and router 1.2.

Router 1.1 forwards $A_{R1}$ and $A_1$ between subnet 1.1.1, subnet 1.1.2 and router 1.

Router 1.1 forwards $A_{R2}$ and $A_2$ between subnet 1.1.1 and subnet 1.1.2.

Router 1.2 forwards $A_{R1}$ and $A_1$ between subnet 1.2.1, subnet 1.2.2 and router 1.

Router 1.2 forwards $A_{R2}$ and $A_2$ between subnet 1.2.1 and subnet 1.2.2.

$A_{R3}$ and $A_3$ are not forwarded by any router.

Assume that each subnet contains nameservers listening on $A_{R1}$, $A_{R2}$ and $A_{R3}$. Assume further that each nameserver runs the MCNS protocol on $A_{R1}$ when attempting to allocate $A_R$, runs the MCNS protocol on $A_{R2}$ when attempting to allocate $A_2$, and runs the MCNS protocol on $A_{R3}$ when attempting to allocate $A_3$. Then:

(1) A nameserver on any subnet may attempt to allocate $A_1$. If successful, $A_1$ has global scope, and no other nameserver on any subnet may allocate it. This would be useful if a node on subnet 1.1.1 wished to communicate with a node on subnet 1.2.1 using address $A_1$.

(2) A nameserver on subnet 1.1.1 or 1.1.2 may attempt to allocate $A_2$. If successful, this allocation of $A_2$ has a scope consisting of subnets 1.1.1 and 1.1.2, and no other nameserver within this scope may allocate $A_2$. However, a nameserver on subnet 1.2.1 or 1.2.2 may also allocate $A_2$, since the scope of the second allocation of $A_2$ does not contain any part of the scope of the first allocation. This allows reuse of address $A_2$ in disjoint scopes. Address reuse is important in networks protocols such as token ring MAC which support very few multicast addresses. Allocating an address having a smaller scope also has the advantage of confining the associated network load created by client applications to the minimal number of routers and subnets necessary to support that address.

(3) A nameserver on subnet 1.1.1 may attempt to allocate $A_3$. If successful, this allocation of $A_3$ has a scope confined to subnet 1.1.1. Again, nameservers on each of the remaining subnets may also successfully allocate $A_3$, since none of the scopes of the allocations overlap.

Figure 3:
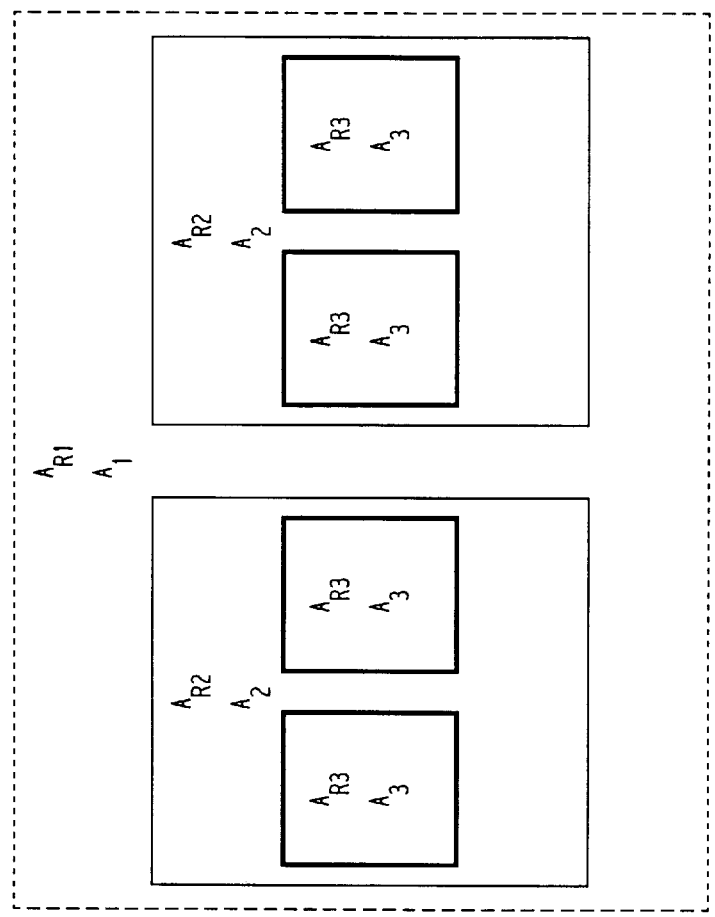
FIG. 3 is a diagram representing the address scope configuration for the network of FIG. 2.

Referring now to FIG. 3, there is shown a diagram representing the address scope configuration for the network of FIG. 2.

Figure 4:
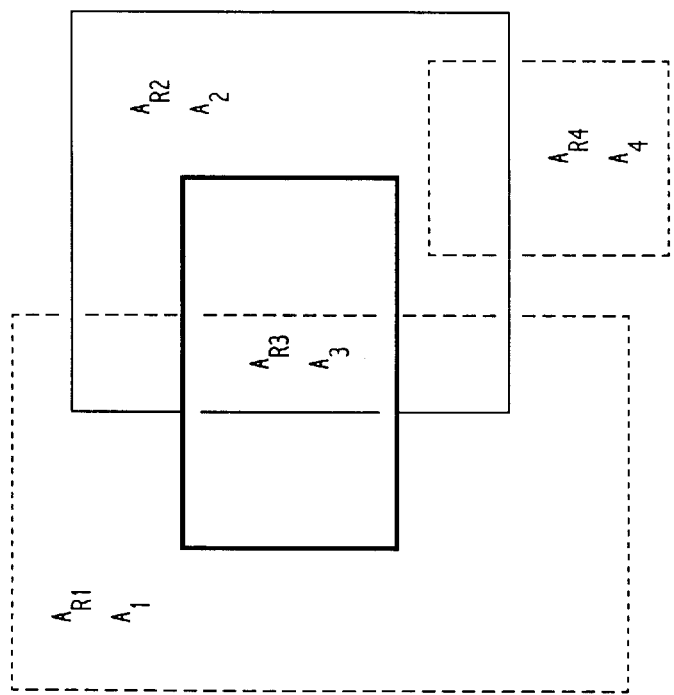
FIG. 4 is a diagram representing the address scope configuration for a more generalized network.

Referring now to FIG. 4, there is shown a diagram representing the address scope configuration for a more generalized network. In general, the multiple resolution address model allows a single nameserver to simultaneously exist in multiple, possibly overlapping scopes.

Regardless of whether the single or multiple resolution address model is employed, a nameserver using the MCNS protocol on resolution address $A_R$ must only allocate multicast addresses whose scope is a subset of the scope of $A_R$.

Multicast Nameserver Protocol Definition

The following terms are used to describe the MCNS protocol:

Application Group A collection of applications running on separate nodes, which have used multicast address nameserver services to allocate a multicast address to provide for communication limited to the group. Different application groups will generally use different multicast addresses; the exception to this is that the same address may be used by different application groups if the scope of each pair of addresses is disjoint.

Nameserver Group A collection of multicast address nameservers which have allocated a particular address for an application group. Each nameserver may belong to zero or more nameserver groups.

Master Nameserver The single nameserver within a nameserver group which allocated or is attempting to allocate the specified address via a Master Get (described below).

Slave Nameserver Any nameserver within a nameserver group which allocated or is attempting to allocate the specified address via a Slave Get (described below).

Master Application The single application within an application group which requested address allocation via a Master Get.

Slave Application Any application within an application group which requested address allocation via a Slave Get.

Matching AR All Address Request packet (described below) containing an address matching the specified address. (The handle (described below) contained in the AR is irrelevant for this definition).

Matching ACK All Acknowledgment packet (described below) containing an address matching the specified address. (The handle contained in the ACK is irrelevant for this definition).

Protocol Introduction

The MCNS protocol specifies the manner in which nameservers interact in order to allocate a multicast address. The MCNS protocol defines (1) the packet structures that nameservers generate to communication with one another, (2) the algorithms that nameservers implement for generating particular packets, and (3) the algorithms that nameservers implement for determining how to respond to incoming the MCNS protocol packets.

The MCNS protocol is designed to support any network protocol. The current specification defines structures for allocating UDP/IP, Ethernet MAC and token ring MAC multicast addresses, and can be trivially expanded to support any other network protocol. The MCNS protocol is independent of any operating system. It is intended to allow interoperation with nameservers running on different operating systems.

Basic Usage Model

The MCNS protocol defines two address allocation modes, an address query function, and an address release function.

Address Allocation

The MCNS protocol defines two address allocation modes, referred to as "Master Get" and "Slave Get".

Master Get

The Master Get allocation mode is requested by only one member of an application group. The nameserver will attempt to allocate a multicast address which no other nameserver has allocated. The manner in which a candidate address is selected for the allocation attempt is not covered by the MCNS protocol. A candidate address may be specified by the application as part of the Master Get request, or the nameserver may select a candidate address from a pool of potential addresses. If successful, the nameserver will return to the client the allocated multicast address and an associated handle. The handle will be unique throughout all space and time. Conceptually, this handle identifies the application group associated with the allocated address.

The client which requested the Master Get may then distribute the address/handle pair to all other application group members. The mechanism by which the client performs this distribution is not a part of the MCNS protocol model. If the address requested by the nameserver has already been allocated, the new allocation attempt fails. The nameserver may return a failure status to the client, retry the same address allocation, or attempt the allocation of a different address. Such policies are not covered by the MCNS protocol.

Slave Get

The Slave Get allocation mode may be optionally requested by all members of the application group, except the Master application. The address and handle pair obtained from the Master Get are used as inputs to the nameserver, which will return success if the same address/handle pair is currently allocated by any nameserver; if the address/handle pair is not currently allocated by any nameserver, or if the address is allocated with a different handle, the Slave Get operation fails.

For a Slave Get operation, the requirement for success is that any other nameserver (either Master or Slave) has the specified address/handle pair allocated. It is not a requirement that the Master nameserver still have this pair allocated. Only if no other nameserver has this pair allocated, or if a nameserver has the specified address allocated with a different handle, will the Slave Get fail. Prior to releasing an allocated address, an application may perform an Address Query to determine whether any other application group members have the address allocated. This allows members of an application group to ensure that at least one member always has the group's address allocated. The Address Query function is described in the following section.

While a Master Get is mandatory for address allocation, Slave Gets are optional. The advantage in performing Slave Gets is that the Master application can subsequently request release of the address and terminate the application, while other Slave applications within the application group continue to use the allocated address without fear of other application groups subsequently allocating and using the same address. If Slave Gets are not performed and the Master application subsequently releases the allocated address, other application groups may allocate and use the same multicast address, even though the address is still in use by members of the first group.

Address Query

An application may determine whether an address is currently allocated by any client other than itself by using the Address Query function. Master applications which have passed an allocated address/handle pair to Slave applications and subsequently wishing to release the address may find this function useful. If the query indicates that the address is allocated by another (Slave) application within the group, the Master application may release the address, knowing that subsequent Slave Get operations by members of the same application group should succeed.

Address Release

When an application is done using an allocated address, the nameserver which allocated the address must release it. The mechanism by which a nameserver determines when an application is done using an allocated address is not covered by the MCNS protocol. Presumably, the application would make a call into the nameserver to explicitly request the address release. Nameservers could also detect the termination of an application, and implicitly release addresses allocated on behalf of that application. An address remains allocated until all nameservers which previously allocated the address release it. Thus, if one member of an application group performs a Master Get, then subsequently releases the address without any intervening Slave Gets, the address becomes available for allocation by other application groups. Conversely, if one member of an application group performs a Master Get, one or more other members perform Slave Gets, and then the Master application releases the address, the address remains allocated until all Slave applications within the group release the address.

Fault Tolerance

If all members of an application group use the same nameserver for the Master and Slave Get operations, address allocation is subject to single point failure. That is, if an application group has allocated an address on a single nameserver, and that nameserver subsequently crashes, members of a different application group may be able to re-allocate the same multicast address (within the same scope) through a different nameserver, resulting in a conflict of address usage.

Conversely, if each member of an application group uses one of several nameservers for the Master and Slave Get operations, the address allocation now has a degree of fault tolerance. Another application group would be able to allocate the same address only if all nameservers in the first nameserver group have crashed. Taken to the extreme, if each member of an application group uses a different nameserver for address allocation, the allocation is protected to the extent all nameservers in the group must crash before protection is lost.

In addition to nameserver crashes, allocated address protection may be lost if intervening routers crash or become significantly backlogged. Again, if an address has been allocated on multiple nameservers which reside on different subnets, a degree of fault tolerance is obtained.

The MCNS Protocol Packet Types

The MCNS protocol uses two packet types:

(1) Address Request (AR): indicates that the sender is requesting allocation information pertaining to the address and handle specified in the AR packet. An AR is used both for address allocation and address query operations.

(2) Acknowledgment (ACK): a statement that the sender has allocated the address and handle specified in the ACK packet. Receivers will interpret this in a positive sense if trying to allocate a matching address and handle, and will interpret in a negative sense if trying to allocate a matching address with a different handle.

AR packets are issued by a nameserver to request allocation state information of an address. An AR effectively asks all other nameservers whether they currently have the specified address allocated and, if so, what handle is associated with it. If an AR is issued for an address allocation attempt and a matching ACK is received, it indicates that the sender of the ACK has the specified address allocated. If the handle specified in the AR matches the handle in the received ACK, the new allocation attempt was successful. If a matching ACK with a different handle (relative the handle specified in the AR) is received, the requested address is currently allocated by another application group, so the new allocation attempt fails. If an AR is issued for an address query operation and a matching ACK is received, the query result passed back to the client again depends on whether the handle in the ACK matches the handle specified in the query. The absence of an ACK response to an AR implies that no other nameserver has the requested address allocated, although a retry mechanism is used to account for dropped or delayed packets.

Master Get Overview

Nameservers implement a Master Get operation by issuing a series of AR packets with a fixed inter-packet delay time. The number of packets in the series, and the inter-packet time delay, is configurable. If a matching ACK packet is received before all the AR packets have been issued, the allocation attempts has failed (some other nameserver has already allocated the same multicast address), and no additional AR packets are issued. Conversely, if all AR packets have been issued and no matching ACK has been received, the allocation attempt is considered successful (no other nameserver has the requested multicast address allocated).

The above description is slightly simplified. It is possible that two or more nameservers may simultaneously be attempting to allocate the same multicast address. This situation is termed an address fight. The resolution for this case is described in a following section.

The following pseudo-code illustrates the simplified (no address fight) Master Get:

Master Get(Input: Requested Address)

```
{
    RetryCount = RETRY_LIMIT
    Create unique handle
    Issue AR
    // "AR Timer" is a one-shot countdown timer
    Set AR Timer to AR_TIMEOUT
    IssueAR = FALSE
    // Loop - issue AR, wait for timeout, retry expiration or receipt of ACK
    while (RetryCount != 0)
    {
        if(IssueAR)
        {
            Issue AR
            // "AR Timer" is a one-shot countdown timer
            Set AR Timer to AR_TIMEOUT
            IssueAR = FALSE
        }
        if(AR Timer expired)
        {
            RetryCount = RetryCount - 1
            IssueAR = TRUE
        }
        if(matching ACK received)
        {
            // Address is already allocated by another nameserver
            Stop AR Timer
            Return failure status
        }
    }
    // Address allocation successful
    Return success status
}
```

Slave Get Overview

The following pseudo-code describes the algorithm that nameservers implement to perform a Slave Get operation. The operation is similar to a Master Get, except that care is taken to avoid having a large number of Slave nameservers simultaneously issue AR packets requesting the same address.

SlaveGet(Input: Requested Address; Input: Associated Handle)

```
{
    RetryCount = RETRY_LIMIT
    // Don't issue an immediate AR. It is likely that many Slave Gets were started at about the same time,
    // and we don't want to flood the network with ARs for the same address. We will set an AR Timer to
    // a random value; hopefully one Slave will timeout first and issue an AR on our behalf. Then we just
    // sit back and wait for a matching ACK. Only one Slave needs to issue an AR on behalf of all
    // pending Slave Gets.
    IssueAR = FALSE
    // "AR Timer" is a one-shot countdown timer
    Set AR Timer to a random value between 1.25 * AR_TIMEOUT and 2.25 * AR_TIMEOUT
    while (RetryCount != 0)
    {
        if(IssueAR)
        {
            Issue AR
            Set AR Timer to AR_TIMEOUT
            IssueAR = FALSE
        }
        if(AR Timer expired)
        {
            RetryCount = RetryCount - 1
            IssueAR = TRUE
        }
        if(matching ACK received)
        {
            Stop AR Timer
            if(ACK handle matches requested handle)
                // Address allocation succeeded
                Return success status
            else
                // Requested address is allocated by a different application group
                Return failure status
        }
        if(matching AR received)
        {
            // Someone issued an AR for the same address. We would like to simply decrement our
            // RetryCount, but need to be careful. A large number of nameservers may simultaneously
            // issue matching ARs, and we don't want to over-decrement our RetryCount without waiting
            // for a suitable number of timeout periods.
            Set RetryCount to the maximum of (RetryCount - 1) and
                Sender's RetryCount (contained in AR packet)
            Stop AR Timer
            Set AR Timer to a random value between 1.25 * AR_TIMEOUT and 2.25 * AR_TIMEOUT
        }
    }
    // Address allocation failed; no Master nameserver was found
    Return failure status
}
```

Address Query

The following pseudo-code describes the algorithm that nameservers implement to perform an Address Query operation. This is very similar to the operations performed during a Master Get operation.

AddressQuery(Input: Address, Input: Associated Handle)

```
{
    RetryCount = RETRY_LIMIT
    Issue AR
    // "AR Timer" is a one-shot countdown timer
    Set AR Timer to AR_TIMEOUT
    IssueAR = FALSE
    // Loop - issue AR, wait for timeout, retry expiration or receipt of
    ACK
    while (RetryCount != 0)
    {
        if(IssueAR)
        {
            Issue AR
            // "AR Timer" is a one-shot countdown timer
            Set AR Timer to AR_TIMEOUT
            IssueAR = FALSE
        }
        if(AR Timer expired)
        {
            RetryCount = RetryCount - 1
            IssueAR = TRUE
        }
        if(matching ACK received)
        {
            // Address is allocated by another nameserver
            Stop AR Timer
            if(ACK handle matches requested handle)
                // Address is allocated with the requested handle
                Return "address allocated with same handle"
            else
                // Address is allocated with a different handle
                Return "address allocated with different handle"
```

-continued

```
        }
    }
    // Address is not allocated
    Return "address not allocated" status
}
```

Address Release

Address release for nameservers is a purely local operation. The nameserver releasing an address updates an internally maintained address table which it maintains, but does not issue any packets on the network. No nameservers, other than the one which performs the address release, are aware that an address release has occurred.

Address Fights

Occasionally two or more nameservers may find themselves competing for the same address (i.e., trying to allocate the same address) with different handles. There are three possible cases, depending on the allocation mode (Master/Slave) of each nameserver:

(1) Master vs. Master. The nameserver with the lower unicast address "wins" the fight. When a Master nameserver with an address allocation pending receives a matching AR from another Master nameserver, the receiving nameserver compares its unicast address with that of the AR sender (the sender's unicast address is contained in the AR packet). If the receiving nameserver determines that it is the loser, it abandons its allocation attempt; otherwise, it will re-issue an AR which will be received by the competing nameserver, causing it to abandon its allocation attempt. Note that all Master vs. Master fights must involve Master nameservers using different handles.

(2) Master vs. Slave. The Slave nameserver always "wins." The presumptions are that (a) there are many Slave applications in the same application group competing for this address vs. only one Master application, and (b) the Slave nameservers probably have a Master nameserver who will ACK this address, causing their allocations to succeed. Therefore, if a Master nameserver with an address allocation pending receives a matching AR from a Slave nameserver, it will immediately abandon its allocation attempt. If a Slave nameserver with a pending allocation receives a matching AR from a Master nameserver, it will continue with its allocation attempt without modification. (A Slave nameserver cannot issue an immediate AR under this condition; otherwise there may be many Slave nameservers attempting to allocate this address who would flood the network with ARs). In this case, the Master nameserver should eventually see either a matching AR issued by a Slave nameserver as part of its normal allocation attempt, or a matching ACK issued by a nameserver which already has the address allocated. If neither a matching AR or ACK is received by the Master nameserver, it can proceed with its allocation attempt, and the Slave nameservers should fail in their allocation attempts (since they will not have seen a matching ACK). Note that all Master vs. Slave fights must involve a Master nameserver using a different handle than any of the Slave nameservers.

(3) Slave vs. Slave (where the Slaves are using different handles). There is no immediate winner. All Slave allocations require a matching ACK for successful completion, meaning that at least one other nameserver must have the address already allocated. If such a nameserver exists, it will determine the winner of the Slave vs. Slave fight when it generates the ACK. Note that there may be no nameserver which has this address allocated, or a nameserver may have the address allocated with a third handle. In these cases, both Slave nameservers will fail in their allocation attempt.

ACK Responses

When nameservers within a nameserver group receive an AR requesting allocation of the address which the group has allocated, ideally one member of the nameserver group will respond with an ACK. The ACK will have the effect of either granting allocation permission, if the handle contained in the AR matches the handle held by the group, or will deny allocation permission if the two handles do not match. The member of the nameserver group which generates the response is determined as follows:

1. If a Master nameserver is present within the group, it will immediately generate an ACK upon receipt of the AR.
2. When Slave nameservers within the group receive an AR, they each set an "ACK timer" to a random countdown value. This random value is chosen to lie within a range maintained independently by each Slave nameserver on a per-address basis. If a Slave nameserver subsequently sees a corresponding ACK before its ACK timer expires, it stops its ACK timer and adjusts the ACK timer range such that future ACK timers will tend to have longer expiration times. Conversely, if a Slave's ACK timer expires without a corresponding ACK having been observed, that Slave will immediately generate an ACK, then adjust its ACK timer range such that future ACK timers will tend to have shorter expiration times.

The method for generating ACKs within a group ensures that at most a few ACKs are generated in response to a matching AR. Ideally, the Master nameserver within the group generates each ACK. However, there are several cases in which this may not occur:

1. The Master nameserver may not have received the original AR (due to loss at a router), or may not receive the AR in sufficient time (due to delay at a router),
2. The Master nameserver may have generated an ACK which was dropped or sufficiently delayed at a router, or
3. The Master nameserver may have released the address prior to receipt of the AR (i.e., there is no longer a Master nameserver for the nameserver group).

If a Master nameserver does not generate an ACK in a timely manner, one of the Slave nameservers needs to pick up this responsibility. In particular, if a Master nameserver no longer exists for the group, one of the Slave nameservers needs to evolve to take on the role of the Master (i.e., quick generation of ACK packets). The method outlined above is intended to allow one Slave (selected at random) to take on the role of the Master in the absence of Master nameserver ACKs. Since this method does not guarantee that only one ACK will be generated, nameservers requesting address allocation must be prepared to receive multiple ACKs in response to ARs which they issue.

Note that Slave nameservers maintain ACK timer ranges on a per-address basis. This means that a Slave nameserver may very well evolve to take on the Master role for one address, while retaining the Slave role for another address.

Finally, a Slave nameserver that has taken on the role of a Master may subsequently release the associated address. If this occurs, another Slave nameserver selected at random will pick up the role of the Master.

MCNS Protocol Details

This section contains details of the MCNS protocol packet structures, and the underlying algorithms that comprise the MCNS protocol. In the protocol description which follows, the fully distributed nameserver model is assumed; that is, each nameserver services exactly one client. This means that each nameserver may allocate only one instance of an address/handle pair. If a nameserver serviced multiple clients, several of these clients could allocate the same address/handle pair on a single nameserver. This assumption simplifies the protocol description, particularly the address allocation routines. Nameservers running this protocol can certainly be constructed which support multiple clients, using a reference Count for each allocated address/handle pair. However, care needs to be taken in implementing the address allocation routines, keeping in mind that multiple clients may simultaneously request allocation of the same address with different handles.

Network Packets

The MCNS protocol uses two packet types: address request (AR) and acknowledgment (ACK). This section defines the content and layout of these packets. All multi-octet numerical values in the MCNS protocol packets are formatted in network byte order. The MCNS protocol packets are sent using the same network protocol on which the address is requested, e.g., requests for UDP/IP multicast addresses are made by issuing the MCNS protocol packets on UDP/IP.

Address Request Packet

Referring now to FIG. 5, there is shown the structure of an address request (AR) packet, according to a preferred embodiment of the present invention.

Major Version 502 (1 octet) indicates which major version of the MCNS protocol was used to generate this packet. The MCNS protocol as defined in this document has a major version number of 1. Changes in the MCNS protocol which render the new protocol incompatible with the previous version will be assigned the next sequential major version number, and a minor version number of 0.

Minor Version 504 (1 octet) indicates which minor version of the MCNS protocol was used to generate this packet. The MCNS protocol as defined in this document has a minor version number of 0. Changes in the MCNS protocol which do not break compatibility with the previous version will be assigned the next sequential minor version number. An example of a change which meets this criteria would be tile support for additional network protocols in each of the Address fields.

A nameserver may be implemented which supports multiple major version numbers. If such a nameserver wishes to generate an ACK in response to a received AR, it uses the same major version number in the ACK packet as was found in the AR packet. The manner in which a nameserver responds to a packet containing an unsupported major version is not defined by the MCNS protocol.

ID 506 (2 octets) arc used to distinguish an AR packet (ID=0) from an ACK packet (ID=1).

Requested Address 508 (36 octets) defines the multicast address being requested by the sender. The format for this field is described in the "Address Format" section below.

Requested Handle 510 (44 octets) defines the handle associated with the Requested Address. The format for this field is described in the "Handle Format and Generation" section below.

Unicast Address 512 (36 octets) defines the unicast address of the nameserver which generated the packet. The format for this field is described in the "Address Format" section below.

A single nameserver may simultaneously support multiple unicast addresses (i.e., the node on which it runs may have multiple network interface cards, or the nameserver may simultaneously support IP and Ethernet MAC packets). Such a nameserver is free to choose any unicast address which it supports for inclusion in the Unicast Address field. When attempting to allocate a particular address, each AR generated in the allocation attempt must contain the same unicast address. However, different unicast addresses may be used in AR packets generated for allocations of different addresses.

Retry Count 514 (4 octets) is a downcounter which indicates the remaining number of ARs to be sent by this nameserver for the Requested Address. The Retry Count of the first AR packet in an allocation attempt will be RETRY__COUNT; subsequent AR packets generated by this nameserver for the Requested Address will contain a Retry Count decremented by one from the previous value. In the absence of any received matching ACKs, Retry Count of the final AR packet will be one.

Flags 516 (32 bits) is a bit map, allocated as follows. Mode flag 518 (MF, bit 0) indicates whether the allocation request is being made in Master mode (MF=0) or Slave mode (MF=1). The mode flag is ignored if the Query flag is set to 1. Query flag 520 (QF, bit 1) indicates whether the AR is issued for an address allocation request (QF=0) or Query mode (QF=1). Reserved bits 522 (bits 2–23) are reserved for future versions of the MCNS protocol and are set to 0. User bits 524 (bits 24–31) are user defined, and may be used for debugging or tracing purposes.

Acknowledgment Packet

Referring now to FIG. 6, there is shown the structure of an acknowledgment (ACK) packet, according to a preferred embodiment of the present invention.

Major Version 602 (1 octet) has the same definition as the major version of the AR packet.

Minor Version 604 (1 octet) has the same definition as the minor version of the AR packet.

ID 606 (2 octets) is used to distinguish an AR packet (ID=0) from an ACK packet (ID=1).

Allocated Address 608 (36 octets) defines the multicast address allocated by the sender. The format for this field is described in the "Address Format" section below.

Allocated Handle 610 (44 octets) defines the handle associated with the Allocated Address. The format for this field is described in the "Address Format and Generation" section below.

Flags 612 (32 bits) is a bit map, allocated as follows. Mode flag 614 (MF, bit 0) indicates whether the allocation request is being made in Master mode (MF=0) or Slave mode (MF=1). Reserved bits 616 (bits 1–23) are reserved for future versions of the MCNS protocol and must be set to 0. User bits 618 (bits 24–31) are user defined, and may be used for debugging or tracing purposes.

Address Format

Referring now to FIG. 7, there is shown the address format used in the AR packet (Requested Address 508 and Unicast Address 512 of FIG. 5) and the ACK packet (Allocated Address 608 of FIG. 6).

Address Type 702 (2 octets) defines the address type contained in the Address field. Defined address types are:

1 UDP/IP
2 Ethernet MAC
3 Token ring MAC

The MCNS protocol can be expanded to support additional network protocols by defining corresponding Address Type values for the new protocols.

Address Length 704 (2 octets) is the number of valid octets in the Address Value field.

Address Value 706–718 (32 octets) is a binary representation of the address. For an IP address, only the first four octets of the Address Value field are used, and the address is stored in network byte order. For Ethernet and token ring MAC addresses, the bytes are stored in descending order (i.e., starting with the highest-order byte and progressing to the lowest-order byte) beginning at the first octet of the Address Value. For all address types, all octets beyond Address length are unused and are set to zero.

Handle Format and Generation

Referring flow to FIG. 8, there is shown the handle format used in the AR packet (Requested Handle 510 of FIG. 5) and the ACK packet (Allocated Handle 610 of FIG. 6).

Unicast Address 802 (36 octets) is the unicast address of the nameserver which generated the handle. If a nameserver has multiple unicast addresses, it may choose any one of them to include in the handle. The Unicast Address field of a handle has the same format as the Address field in the AR and ACK packets.

Unique Value 804–806 (8 octets). Each handle generated by a nameserver contains a unique value in this field, i.e., a particular nameserver should never, throughout all time, use the same value in the Unique Value field of two handles. This uniqueness applies across nameserver restarts/reboots. The manner in which nameservers generate a value for the Unique Value field is not specified by the MCNS protocol, and is entirely at the discretion of each nameserver.

Since no two nameservers can generate handles with the same Address field, and an individual nameserver will never generate two handles with the same Unique Value field, all handles generated by all nameservers must be unique.

Protocol Descriptions

Each nameserver maintains a table of multicast addresses which it has allocated, or for which allocation is pending. Nameservers do not keep track of any addresses allocated by other nameservers. For each address in a nameserver's table, there is certain state information which the nameserver maintains. For the purpose of describing the protocol details, it will be assumed that the state information for each address is stored in an ADDRINFO structure as defined below. This structural description is not meant to imply a specific method of implementation, but is used solely for explaining the address state in relation to the allocation algorithms. Certain constant values referenced in the description of the ADDRINFO fields are explained in the following paragraph.

The fields contained in the ADDRINFO structure are:

Address The address which is allocated, or whose allocation is pending.

Handle The handle associated with the Address.

AllocationState State of the address allocation, either "Pending", "Allocated" or "Query".

The mode in which the allocation or query was made or is being attempted, either "Master" or "Slave".

RetryCount Downcounter containing the number of ARs remaining to be issued for address allocation. This will start at RETRY_LIMIT, and will be decremented each time the AR timer expires. If RetryCount reaches zero, the allocation attempt is complete (successful if RequestType is "Master", failure if RequestType is "Slave"). This count is only needed while the AllocationState is "Pending".

ARTimer ID for an AR timer. Used to match a timer expiration with this particular address allocation attempt and event (AR expiration). This ID is only needed while the AllocationState is "Pending".

ACKTimer ID for an ACK timer. Used to match a timer expiration with this particular address allocation and event (ACK expiration). This ID is only needed when the AllocationState is "Allocated".

ACKMinDelay The lower value of a range from which an ACK timeout value will be randomly set. Needed only when the RequestType is "Slave" and the AllocationState is "Allocated". The minimum value is zero, and the maximum value is the lessor of MAX_MIN_DELAY and ACKMaxDelay.

ACKMaxDelay The upper value of a range from which an ACK timeout value will be randomly set. Needed only when the RequestType is "Slave" and the AllocationState is "Allocated". The minimum value is the greater of MIN_MAX_DELAY and ACKMinDelay, and the maximum value is MAX_DELAY.

The following constants are used in the algorithmic description; their values are not defined by the MCNS protocol, but are implementation dependent:

RETRY_LIMIT The maximum number of ARs to be issued in attempting to allocate an address. (If a matching ACK is received prior to issuing RETRY_COUNT ARs, address allocation will terminate upon receipt of the ACK).

AR_TIMEOUT Time to wait between successive issuance's of ARs. In some cases, Slave nameservers will create a random AR timeout based on the value of AR_TIMEOUT.

MAX_MIN_DELAY The maximum value to which MinDelay may be increased. Must be greater than zero.

MIN_MAX_DELAY The minimum value to which Max_Delay may be decreased. Must be greater than zero, and less than MAX_DELAY.

MAX_DELAY The maximum value to which MaxDelay may be increased. Must be greater than MIN_MAX_DELAY.

WEAK_DELTA The amount by which to change ACKMinDelay and ACKMaxDelay when a "weak increase" or "weak decrease" is required.

STRONG_DELTA The amount by which to change ACKMinDelay and ACKMaxDelay when a "strong increase" or "strong decrease" is required.

Throughout the algorithmic descriptions, individual fields of an ADDRINFO structure will be shown using standard "C" language coding; e.g., ADDRINFO.Allocation State refers to the Allocation State field of a particular ADDRINFO structure.

All timers used in the algorithmic descriptions are assumed to be one-shot, not repetitive. A single nameserver may have multiple timers active simultaneously. It is assumed that when a timer expires, it returns to the nameserver a unique ID which allows the nameserver to determine which particular timer expired. In the algorithmic descriptions which follow, the notation "Start ADDRINFO.XXXTimer (value)" means that the specified timer (where XXX denotes AR or ACK) should be started with the countdown value "value".

The algorithmic descriptions assume the existence of a routine "random" which accepts as parameters a lower and upper bound. The function returns a pseudo-random number exponentially distributed between the lower and upper bounds, inclusive. The function is used to set timer values. Most commonly, it is used to set an ACK timer to a timeout value between ACKMinDelay and ACKMaxDelay.

As discussed in the above section entitled "ACK Responses," all members of a nameserver group are responsible for ensuring that at least one group member responds to a matching AR. If a Master nameserver for the group exists, it will immediately generate an ACK in response to a matching AR. If a Master nameserver for the group does not exist (i.e., the Master nameserver has released the allocated address), one of the Slave nameservers must pick up the role of the Master. Slave nameservers accomplish this by setting an ACK timer to a random value upon receipt of a matching AR. If a nameserver's ACK timer expires before a matching ACK is seen, that nameserver will immediately generate an ACK, then adjust its ACK timer ranges such that future ACK responses on that address tend to occur sooner. Conversely, if a nameserver sees a matching ACK before its ACK timer expires, it will stop its ACK timer and adjust its ACK timer ranges such that future ACK responses on that address tend to occur later.

When a nameserver needs to set an ACK timer for a particular address, it will choose an exponentially distributed pseudo-random number between ADDRINFO.ACKMinDelay and ADDRINFO.ACKMaxDelay. After expiration of the ACK timer, or the observance of a matching ACK, each Slave nameserver will adjust the ACKMinDelay and ACKMaxDelay in one of four ways, as specified in the flow charts which follow. These adjustment types are defined as:

Weak Increase:
  ACKMinDelay will be set to the lessor of(ACKMinDelay+WEAK_DELTA) and MAX_MIN_DELAY.
  ACKMaxDelay will be set to the lessor of (ACKMaxDelay+WEAK_DELTA) and MAX_DELAY.

Strong, Increase:
  ACKMinDelay will be set to the lessor of (ACKMinDelay+STRONG_DELTA) and MAX_MIN_DELAY.
  ACKMaxDelay will be set to the lessor of (ACKMaxDelay+STRONG_DELTA) and MAX_DELAY.

Weak Decrease:
  ACKMinDelay will be set to the greater of (ACKMinDelay-WEAK_DELTA) and zero.
  ACKMaxDelay will be set to the greater of (ACKMaxDelay-WEAK_DELTA) and MIN_MAX_DELAY.

Strong Decrease:
  ACKMinDelay will be set to the greater of (ACKMinDelay-STRONG_DELTA) and zero.
  ACKMaxDelay will be set to the greater of (ACKMaxDelay-STRONG_DELTA) and MIN_MAX_DELAY.

Since all nameserver communication occurs over multicast addresses, nameservers will typically receive many the MCNS protocol packets containing addresses which the receiving nameserver does not have allocated. Therefore, nameservers must be prepared to receive and efficiently discard such irrelevant packets. As an optimization, nameservers which do not have any addresses allocated, and for which no address allocation is pending, may wish to disable reception of packets on all nameserver resolution addresses.

In the flowcharts which follow, conditions which must logically be true at certain points, as well as clarifying comments, are shown in dotted boxes, using standard "C" language syntax.

Master Get Operation

Referring now to FIG. 9, there is shown a flow diagram of the processing for a Master Get operation, according to a preferred embodiment of the present invention. Pseudo-code depicting the actions to be taken for a Master Get operation is shown below. Notes:

(1) The multicast address which the nameserver will attempt to allocate is provided as an input. The manner in which a candidate multicast address is selected is not specified by the MCNS protocol.

(2) A Master nameserver does not use the ACK timer. If an ACK packet needs to be sent, the Master nameserver will send it immediately. Therefore, the ACKMinDelay and ACKMaxDelay fields of the ADDRINFO structure are not initialized.

MasterGet( input: RequestedAddress)

```
{
    Allocate ADDRINFO structure (Step 902 of FIG. 9)
    ADDRINFO.Address = DesiredAddress
    Create a unique Handle
    ADDRINFO.Handle = Handle
    ADDRINFO.AllocationState = Pending
    ADDRINFO.RequestType = Master
    ADDRINFO.RetryCount = RETRY_LIMIT
    // No need to initialize ADDRINFO.ACKMinDelay or ADDRINFO.ACKMaxDelay; Masters always
    // send immediate ACKs when needed
    Start ADDRINFO.ARTimer(AR_TIMEOUT)       // Step 904
    Send AR packet                            // Step 906
    // Actions to be taken on the following cases are described in pseudo-code in subsequent sections
    Wait for one of:                          // Step 908
        AR receipt
        ACK receipt
        AR timer
}
```

Slave Get Operation

Referring now to FIG. 10, there is shown a flow diagram of the processing for a Slave Get operation, according to a preferred embodiment of the present invention. Pseudo-code depicting the actions to be taken for a Slave Get operation is shown below. Notes:

(1) The multicast address and associated handle which the nameserver will attempt to allocate is provided as an input. Both of these values must have been previously obtained from a successful Master Get operation.

(2) A nameserver does not immediately issue an AR upon initiation of a Slave Get operation. It is likely that multiple Slave nameservers will simultaneously initiate Slave Get operations for the same address. If each nameserver issued an immediate AR, the network would be flooded with requests for the same address. Instead, each Slave nameserver sets a random AR timer. If a matching AR is seen before the AR timer expires, the Slave nameserver does not need to issue its own AR. If the AR timer expires before a matching AR is seen, that nameserver will issue an AR which will satisfy the needs of all other nameservers attempting to allocate this address.

SlaveGet(Input: RequestedAddress; Input: RequestedHandle)

```
{
    Allocate ADDRINFO structure (Step 1002 of FIG. 10)
    ADDRINFO.Address = RequestedAddress
    ADDRINFO.Handle = RequestedHandle
    ADDRINFO.AllocationState = Pending
    ADDRINFO.RequestType = Slave
    ADDRINFO.RetryCount = RETRY_LIMIT
    ADDRINFO.ACKMinDelay = 0
    ADDRINFO.ACKMaxDelay = MAX_DELAY
    Start ADDRINFO.ARTimer(random(1.25*AR_TIMEOUT, 2.25*AR_TIMEOUT))    // Step 1004
    // Don't send an AR packet immediately. Another Slave may have already issued an AR for the same
    // address, so this Slave can wait slightly longer than AR_TIMEOUT for an ACK. This prevents a
    // multitude of Slaves from simultaneously swamping a Master with ARs for the same address
    // Actions to be taken on the following cases are described in pseudo-code in subsequent sections
    Wait for one of:                              // Step 1006
        AR receipt
        ACK receipt
        AR timer
}
```

Address Query Operation

Referring now to FIG. 11, there is shown a flow diagram of the processing for an Address Query operation, according to a preferred embodiment of the present invention. Pseudo-code depicting the actions to be taken for an Address Query operation is shown below. Notes:

(1) The multicast address and handle for which the query is to be performed are provided as an input.

AddressQuery(Input: DesiredAddress; Input: DesiredHandle)

```
{
    Allocate ADDRINFO structure (Step 1102 of FIG. 11)
    ADDRINFO.Address = DesiredAddress
    ADDRINFO.Handle = DesiredHandle
    ADDRINFO.AllocationState = Query
    ADDRINFO.RetryCount = RETRY_LIMIT
    // No need to initialize ADDRINFO.ACKMinDelay or ADDRINFO.ACKMaxDelay; Queries never
    // generate ACKs
    Send AR packet                                // Step 1104
    // Actions to be taken on the following cases are described in pseudo-code in subsequent sections
    Wait for one of:                              // Step 1106
        AR receipt
        ACK receipt
        AR timer
}
```

Address Release

Referring now to FIG. 12, there is shown a flow diagram of the processing for an Address Release operation, according to a preferred embodiment of the present invention. Pseudo-code depicting the actions to be taken for a Address Release operation is shown below. Notes:

(1) The handle of the address to be released is provided as input.

(2) The Address Release operation is purely local. No the MCNS protocol packets are issued.

AddressRelease(Input: HandleFromMaster)

```
{
    Find address associated with the handle (Step 1202 of FIG. 12)
    // ADDRINFO.Handle == HandleFromMaster
    Remove ADDRINFO                               // Step 1204
}
```

ACK Timer

Referring now to FIG. 13, there is shown a flow diagram of the processing for an ACK Timer operation, according to a preferred embodiment of the present invention. Pseudo-code depicting the actions to be taken on the expiration of an ACK timer is shown below. Notes:

(1) The ID of the timer which expired is provided as input.

(2) The nameserver whose ACK timer expired must be a Slave nameserver, who previously saw an AR for an address which it had allocated, but did not see a matching ACK. An ACK will be issued, and the ACK timer range adjusted to generate quicker responses in the future.

ACKTimer(Input: ACKTimerID)

```
{
    // This Slave saw an AR, but did not see an ACK from the Master
    Find address associated with this ACK timer (Step 1302 of FIG. 13)
    // ADDRINFO.ACKTimer == ACKTimerID
    // ADDRINFO.AllocationState == Allocated
    // ADDRINFO.RequestType == Slave
    Send ACK packet                           // Step 1304
    // Change delay range for quicker AR responses in the future, i.e., begin to take on role of a Master
    // Step 1306
    Weakly decrease ADDRINFO.ACKMinDelay
    Weakly decrease ADDRINFO.ACKMaxDElay
}
```

AR Timer

Referring now to FIG. 14, there is shown a flow diagram of the processing for an AR Timer operation, according to a preferred embodiment of the present invention. Pseudo-code depicting the actions to be taken on the expiration of an AR timer is shown below. Notes:

(1) The ID of the timer which expired is provided as input.

(2) The nameserver whose AR timer expired must be attempting to allocate an address. Some nameserver (not necessarily this one) issued an AR for the requested address, but an ACK was not seen within the timeout period.

(3) If the nameserver is a Master, and the retry count is decremented to zero, the allocation attempt was successful, since no other nameserver has this address allocated. The nameserver will then issue an ACK. This will cause any other nameservers competing for the same address to abandon their attempt. If the nameserver is a Slave and the retry count is decremented to zero, the allocation attempt has failed since the Slave was unable to contact any other nameserver (Master or Slave) which had this address allocated.

ARTimer(Input: ARTimerID)

```
{
    // An AR was issued and/or a Slave's AR timer expired, but no ACK was seen
    Find address associated with this AR timer (Step 1402 of FIG. 14)
    // ADDRINFO.ARTimer == ARTimerID
    // ADDRINFO.AllocationState == Pending or Query
    ADDRINFO.RetryCount = ADDRINFO.RetryCount - 1    // Step 1404
    If(ADDRINFO.RetryCount == 0)                      // Step 1406
    {
        // Done (either success or failure)
        If(ADDRINFO.AllocationState == Query)         // Step 1408
        {
            Remove ADDRINFO                           // Step 1410
            Return "Address not allocated"            // Step 1412
        }
        If(ADDRINFO.RequestType == Master)            // Step 1414
        {
            ADDRINFO.AllocationState = Allocated      // Step 1416
            // Send an ACK packet to cause any other nameservers competing for this address to give up
            Send ACK packet                           // Step 1418
            Return "Address allocated"                // Step 1420
        }
        Remove ADDRINFO                               // Step 1422
        // Slave request; no other members of the application group have the address allocated
        Return "Address not available, no peers"      // Step 1424
    }
    // ADDRINFO.RetryCount > 0
    Start ADDRINFO.ARTimer(AR_TIMEOUT)                // Step 1426
    Send AR packet                                    // Step 1428
    // Actions to be taken on the following cases are described in pseudo-code in subsequent sections
    Wait for one of:                                  // Step 1430
        AR receipt
        ACK receipt
        AR timer
}
```

ACK Receipt

Referring now to FIG. 15, there is shown a flow diagram of the processing for all ACK Receipt operation, according to a preferred embodiment of the present invention. Pseudo-code depicting the actions to be taken on the receipt of an ACK packet is shown below. Notes:

(1) The contents of the ACK packet is provided as input.

(2) If the receiving nameserver is not attempting to allocate or query the Allocated Address in specified in the ACK packet, the packet is irrelevant to the receiving nameserver and should be discarded.

(3) If the receiving nameserver is attempting to allocate the Allocated Address specified in the ACK packet, the allocation attempt is successful if the handle in the ACK packet matches the handle on which the receiver is requesting allocation. In this case, the receiver must be a Master. If the two handles do not match, the requested address is already allocated by another group, so the receiver's allocation attempt fails.

(4) If the receiving nameserver is querying an address, the Allocated Address specified in the ACK packet may appear twice in the receiver's ADDRINFO table. One entry will have AllocationState set to Allocated, and the other entry will have AllocationState set to Query. In this case, the following algorithm is performed for both entries.

ACKReceipt(Input: ACK packet)

```
{
    Find address associated with this ACK packet (Step 1502 of FIG. 15)
    // ADDRINFO.Address == ACK.AllocatedAddress
    If(matching ADDRINFO.Address does not exist)                              // Step 1504
    {
        Return                                                                // Step 1506
    }
    If(ADDRINFO.ACKTimer active)                                              // Step 1508
    {
        Stop ADDRINFO.ACKTimer                                                // Step 1510
    }
    If(ADDRINFO.Handle == ACK.AllocatedHandle)                                // Step 1512
    {
        If(ADDRINFO.AllocationState == Allocated)                             // Step 1514
        {
            If(ADDRINFO.RequestType == Slave)                                 // Step 1516
            {
                If(ACK.Flags indicates Slave)                                 // Step 1518
                {
                    // Another Slave is taking over the role of the Master   // Step 1520
                    Weakly increase ADDRINFO.ACKMinDelay
                    Weakly increase ADDRINFO.ACKMaxDelay
                }
                Else
                {
                    // The real Master has responded to an AR with this ACK  // Step 1522
                    Strongly increase ADDRINFO.ACKMinDelay
                    Strongly increase ADDRINFO.ACKMaxDelay
                }
            }
        }
        Else // ADDRINFO.AllocationState != Allocated
        {
            // Either a Query operation or successful Slave allocation
            Stop ADDRINFO.ARTimer                                             // Step 1524
            If(ADDRINFO.AllocationState == Query)                             // Step 1526
            {
                Remove ADDRINFO                                               // Step 1528
                Return "Address allocated with same handle"                   // Step 1530
            }
            Else // ADDRINFO.AllocationState != QUERY
            {
                // Successful Slave allocation
                ADDRINFO.AllocationState = Allocated                          // Step 1532
                Return "Address successfully allocated"                       // Step 1534
            }
        }
    }
    Else // ADDRINFO.Handle != ACK.AllocatedHandle
    {
        // Address cannot be allocated on this nameserver
        Stop ADDRINFO.ARTimer                                                 // Step 1536
        If(ADDRINFO.AllocationState == Query)                                 // Step 1538
        {
            Remove ADDRINFO                                                   // Step 1540
            Return "Address allocated with different handle"                  // Step 1542
        }
        Else
        {
            // Nameserver must be attempting to allocate this address
            Remove ADDRINFO                                                   // Step 1544
            Return "Address allocation failed; address in use"                // Step 1546
        }
    }
}
```

AR Receipt

Referring now to FIG. 16, there is shown a flow diagram of the processing for an AR Receipt operation, according to a preferred embodiment of the present invention. Pseudocode depicting the actions to be taken on the receipt of an AR packet is shown below. Notes:

(1) The contents of the AR packet is provided as input.
(2) If the receiving nameserver does not have, or is not attempting to allocate the Requested Address as specified in the AR packet, the packet is irrelevant to the receiving nameserver and should be discarded.
(3) If the receiving nameserver is a Master who is requesting allocation of the address specified in the AR packet, the receiver uses the AR to determine the winner of the address fight. The winner is determined by comparing, the sender's and receiver's unicast address, with both addresses contained in the Address format as defined in the earlier section entitled "Address Format." A byte-wise comparison of addresses is performed, starting with the first octet of the Address Type field and ending with the last octet of the Address Value field. If the receiver determines that it is the loser, it immediately abandons the allocation attempt. If the receiver determines that it is the winner, it immediately issues an AR, causing the original sender to abandon its allocation attempt.

ARReceipt(Input: AR packet)

```
{
    Find address associated with this AR packet (Step 1602 of FIG. 16)
    // ADDRINFO.Address == AR.RequestedAddress
    If(matching ADDRINFO.Address does not exist)                    // Step 1604
    {
        Return                                                      // Step 1606
    }
    If(ADDRINFO.AllocationState == Query)                           // Step 1608
    {
        Return                                                      // Step 1610
    }
    Else
    {
        If(ADDRINFO.Handle == AR.RequestedHandle)                   // Step 1612
        {
            // AR.Flags must indicate Slave
            If(ADDRINFO.AllocationState == Allocated)               // Step 1614
            {
Line A:         If(ADDRINFO.RequestType == Master)                  // Step 1616
                {
                    Send ACK packet                                 // Step 1618
                }
                Else
                {
                    If(ADDRINFO.ACKTimer inactive)                  // Step 1620
                    {
                        Start ADDRINFO.ACKTimer(random(ADDRINFO.ACKMinDelay,
                            ADDRINFO.ACKMaxDelay))                  // Step 1622
                    }
                }
            }
            Else // ADDRINFO.AllocationState != Allocated
            {
                // ADDRINFO.RequestType == Slave
                // Step 1624
                ADDRINFO.RetryCount = Maximum(ADDRINFO.RetryCount-1, AR.RetryCount)
                Stop ADDRINFO.ARTimer                               // Step 1626
                // Step 1628
                Start ADDRINFO.ARTimer(random(1.25*AR_TIMEOUT, 2.25*AR_TIMEOUT))
            }
        }
        Else // ADDRINFO.Handle != AR.RequestedHandle
        {
            If(ADDRINFO.AllocationState == Allocated)               // Step 1630
            {
                Goto Line A
            }
            Else
            {
                If(ADDRINFO.RequestType == Slave)                   // Step 1632
                {
                    // Address fight; do nothing
                }
                Else
                {
                    If(AR.Flags indicates Master)                   // Step 1634
                    {
                        // Master vs. Master address fight
                        If(ADDRINFO.Address < AR.RequestedAddress)  // Step 1636
                        {
                            // we won the fight; send an AR to tell the other nameserver that he lost
                            Send AR packet                          // Step 1638
```

```
                    }
                    Else
                    {
Line B:                        // we lost the fight
                        Stop ADDRINFO.ARTimer            // Step 1640
                        Remove ADDRINFO                  // Step 1642
                        Return "Address allocation failed"  // Step 1644
                    }
                }
                Else // AR.Flags does not indicate Master
                {
                    Goto Line B
                }
            }
        }
    }
}
```

Area Not Covered in the MCNS Protocol

The following areas are not covered in the MCNS Protocol:

a. The resolution addresses and ports used by nameservers are not defined by the MCNS protocol. Numerical values for the constants listed in the earlier section entitled "Protocol Descriptions" are also not defined.

b. The interface between applications and nameservers is not specified.

c. The method by which candidate multicast addresses are chosen for allocation attempt is not specified. One possibility is that applications may direct the nameserver to select a multicast address based on some mapping algorithm which uses the application's unicast address to generate a multicast address. Nameservers may also randomly select candidate addresses from a pool set up by an administrator.

d. Various optimizations are possible which are not addressed here. For example, at initialization time, nameservers could pre-allocate a pool of multicast addresses. Client requests could then be immediately satisfied from this pool.

Security Considerations

The MCNS protocol as described above does not address any security issues. The proposed protocol is vulnerable to attacks, including:

a. Applications may listen on the resolution address/port for ACK packets, enabling them to collect information on which addresses are in use. Such applications could subsequently listen in on allocated addresses.

b. Applications could generate bogus ACK packets in response to any received AR packet, thus preventing the allocation of any multicast address by any other application.

User's Guide

Multicasting of data provides a bandwidth-efficient mechanism for dissemination of data for applications which communicate in a one-to-many or many-to-many mode. Disjoint groups of such applications require a mechanism for selecting a multicast address unique to each group, to prevent intra-group communication interference. The multicast nameserver (MCNS) protocol, a preferred embodiment of the present invention, has been developed to support such applications by allowing groups of client applications to obtain unique multicast addresses. This nameserver is a completely distributed, Windows-based server which supports allocation of several multicast address types, including UDP/IP, DLM/Ethernet MAC, and DLM/token ring MAC.

The following sections describe the nameserver components, usage model, application program interface, and associated INI file settings. They are intended to provide all information needed by application developers to configure and utilize the nameserver services.

Components and Nameserver Usage

The nameserver consists of five components:

MCNSERVE.DLL (nameserver core)

MCNSERVE.EXE (nameserver helper task)

MCNSERVE.LIB (import library)

MCNSERVE.H (nameserver function prototypes, nameserver constants and error codes)

MCNSERVE.INI (contains default nameserver settings)

MCNSERVE.EXE is loaded via a WinExeco system call, without specifying an absolute pathname. Consult the Windows Programmer's Reference Manuals to determine the locations in which Windows searches to locate this file.

MCNSERVE.INI resides in the same directory from which MCNSERVE.DLL was loaded. Applications wishing to use nameserver services may accomplish this as follows:

Include the file MCNSERVE.H in all application source files that use nameserver services. This include file contains nameserver function prototypes, nameserver constants and error codes.

Ensure that the nameserver initialization file (MCNSERVE.INI) is properly configured. Details can be found in a later section entitled "MCNSERVE.INI Initialization File."

Load the nameserver dynamically linked library (MCNSERVE.DLL).

Invoke nameserver services using the API described in a later section entitle "Application Program Interface."

The nameserver helper task (MCNSERVE.EXE) is loaded and unloaded automatically by MCNSERVE.DLL. Applications (and users) should never load or unload the helper task themselves.

Usage Model

This section describes tile usage model which applications should follow when using the nameserver. The information presented here serves as an introduction to the application program interface described in a later section entitled "Application Program Interface." In the following discussion the term "group" refers to a collection of applications on different nodes which wish to communicate with each other via a common multicast address. An example of a group is a set of applications participating in a single multipoint conference. Note that there may be multiple distinct groups, possibly consisting of the same application on each node, but with each group using a different multicast address.

Although this section does not describe the nameserver architecture, the reader does need to be aware of certain architectural features which influence the usage model:

The nameserver uses a fully distributed architecture. A single copy of the nameserver runs on each node which makes use of nameserver services.

The usage model requires that at least one member of a group wishing to obtain a multicast address request allocation via the nameserver. Other members of the same group may optionally reserve the same address with their nameserver. The pros and cons of this optional reservation are discussed below.

When the nameserver allocates a multicast address on behalf of a client, only the nameserver on which the request was made retains knowledge of the allocation. If this nameserver is terminated for any reason, and if no other nameserver in the addresses group has allocated the address, this address becomes available for other groups to allocate.

The nameserver services fall into three categories: address allocation, address release, and address ownership changes.

Address Allocation

The nameserver provides two modes, Master and Slave, in which addresses may be allocated. When a group of applications wishes to use a common multicast address, exactly one member of the group requests address allocation in the Master mode. This member will henceforth be called the Master application. It is the responsibility of the application group to determine which member performs the Master request. If the Master address allocation is successful, the nameserver will return to the client a multicast address and an address handle. This handle is guaranteed to be unique among all nameservers.

The Master application would normally pass the multicast address on to other members of the group. It is the responsibility of the application group to determine how this should be accomplished. The handle associated with the allocated address may also be passed from the Master to the other members of the group. At this point, the address has been allocated on the nameserver local to the Master application. Should this nameserver terminate for any reason, the address would become available for allocation by members of other groups.

Master allocation requires that the client specify three attributes concerning the allocation:

Initial address—The initial multicast address to be allocated can be determined in one of three ways, as specified by the client:

"Any Address"—the nameserver will select an initial multicast address which it will attempt to allocate. The initial address will be obtained by running the nameserver's unicast address through some (unspecified) algorithm which will map the unicast address to a multicast address. If all applications use this address allocation mode, the initial multicast address so obtained will very likely be unique, and the initial allocation attempt will succeed. If it turns out that the initial address is already in use, successive multicast addresses will be chosen at random until either a successful allocation is obtained, or the nameserver determines that it has attempted allocation of all possible addresses.

"Suggest Address"—the client specifies a multicast address on which initial allocation will be attempted. If the address is already in use, successive multicast addresses will be chosen at random until either a successful allocation is obtained, or the nameserver determines that it has attempted allocation of all possible addresses.

"Use Address"—the client specifies a multicast address on which initial allocation will be attempted. If the address is already in use, the nameserver will return an error.

Owner—Each allocated address has one or more owners, where an owner is defined as a Windows task. Address ownership is discussed in more detail below. The client specifies the initial address owner, either as:

NULL—the calling task is the initial owner.

Valid task handle—the specified task becomes the initial owner. This is useful if address allocation is attempted from interrupt mode, where the task context may be random. This, of course, requires that the client have access to a valid task handle to which initial ownership will be assigned.

Callback mode—address allocation is asynchronous, and one of two callback modes are specified by the client:

Callback function—upon completion of address allocation, the nameserver will invoke a user-specified callback function.

Windows callback—upon completion of address allocation, the nameserver will post a message to a user-specified window.

Network provider—the nameserver can use one of two providers to allocate addresses: Pit and DLM. The client specifies which provider are to be used for the allocation. The client ensures that a multicast address obtained with a particular provider is subsequently used only with that same provider (e.g., a multicast address allocated using PII as the network provider is subsequently used by an application using PII, not DLM).

As stated above, the Master application will typically pass the allocated multicast address, and possibly the associated handle, to other members of the group. The other members may optionally perform Slave allocations on their own nameservers. The advantages of performing Slave allocations are:

The Slave applications are ensured that, if the Slave allocation is successful, the address obtained from the Master is still available. As stated above, if a Master application allocates an address, passes the address on to other group members, and then the Master's nameserver terminates without an intervening Slave allocation, the same address could then be allocated by a member of another group.

If the Master application terminates and/or releases the address, the Slave nameservers will still have the address allocated, thus preventing other groups from allocating this address.

Slave allocation results in additional network traffic, and is not recommended in cases where the multicast is used in a one-to-many mode. For example, if an application server multicasts packets to many client applications, with no packets traveling from clients to the server, it is recommended that only the application server perform a Master allocation, and that the application clients not perform Slave allocations. If the application server terminates and is later restarted, it would typically perform another Master allocation to obtain a new multicast address, so there is little or no point in having Slaves attempt to retain allocation of the old address.

Slave allocation requires that the client specify four attributes concerning the allocation:

Address—this must match the address obtained from the Master allocation.

Address handle—this must match the address handle obtained from the Master allocation. The handle is used to associate the Slave allocation request with allocations of the same address performed by other members of the same group. If a member of another group attempts to allocate the same address, it will do so using a different handle, causing its allocation attempt to fail.

Owner—this has the same meaning as in the Master allocation call.

Callback mode—this has the same meaning as in the Master allocation call.

Network provider—this has the same meaning as in the Master allocation call.

Slave allocations require that at least one other member of the same group (typically the Master) already have the address allocated at the time the Slave request is performed. However, once at least one Slave has successfully allocated an address, the Master application may release the address and/or terminate. Subsequent Slave requests may successfully complete as long as at least one peer Slave retains allocation of that address.

In summary, one group member performs a Master allocation which generates an address and handle as output. This address/handle pair may optionally be used as inputs to Slave allocation requests by other members of the group.

Address Release

When an application is finished using an allocated address, the address should be released for use by other applications. To release an address, an application simply calls the address release routine (described in the "Application Program Interface" section below). Releasing an address is the same regardless of whether it was allocated in Master or Slave mode. There are two points to note concerning address release:

Only those members of a group which allocated the address (either in Master or Slave mode) should release it.

The allocated address does not become available for reuse (i.e., is not fully released) until all members that allocated the address have released it.

Address Ownership Changes

Each allocated address has at least one owner associated with it. Ownership is determined at the Windows task level. When an address is allocated, the client requesting the address specifies the initial owner. Typically, the initial owner would be the calling client task. However, if the address is allocated in interrupt mode, where the task context may be arbitrary, the caller may specify an explicit Windows' task handle as the initial owner, rather than the current task.

Once an address has been allocated, owners may be added or removed from the addresses ownership list. Address ownership has two purposes:

(1) Non-owners are prevented from accidentally or maliciously releasing an address.

(2) If an owning task terminates or crashes without releasing an address, the nameserver may be able to detect this occurrence and implicitly release the address.

There are two rules associated with address ownership:

(a) Address ownership changes require that the address handle be used in all nameserver calls. This minimizes the possibility of address ownership modification by a task not on the ownership list.

(b) The nameserver will periodically validate owner's task handles associated with each allocated address. If an invalid task handle is found (because the task terminated or crashed without releasing the address), that owner will be removed from the ownership list. If the ownership list becomes empty, the address will be implicitly released. However, other nameservers in the application's group may continue to hold the address allocated.

Application Program Interface

The nameserver provides five procedures to be used by clients:

```
UINT MCNSGetMasterMulticastAddr(  LPTADDR        lpTAddr,
                                  LPMCNSHADDR    lpMCNShAddr,
                                  HTASK          hOwner,
                                  WORD           wFlags,
                   LPVOID                        Callback)
UINT MCNSGetSlaveMulticastAddr(   LPTADDR        lpTAddr,
                                  LPMCNSHADDR    lpMCNShAddr,
                                  HTASK          hOwner,
                                  WORD           wFlags,
                                  LPVOID         Callback)
UINT MCNSReleaseMulticastAddr(    LPMCNSHADDR    lpMCNShAddr)
UINT MCNSAddOwner(                LPMCNSHADDR    lpMCNShAddr,
                                  HTASK          hNewOwner)
UINT MCNSRemoveOwner(             LPMCNSHADDR    lpMCNShAddr,
                                  HTASK          hOldOwner,
                                  BOOL           bReleaseAddr)
         The TADDR structure is defined as follows:
struct {
    WORD   AddressType;
    WORD   AddressLength;
    BYTE   Address[80];
} TADDR;
```

AddressType defines the type of network address contained in the structure. The nameserver accepts the following AddressTypes: TRID_UDP (UDP/IP), TRID_

ETHERNET_MAC (DLM running on Ethernet MAC), and TRID_TOKENRING_MAC (DLM running on token ring MAC).

AddressLength indicates the number of valid bytes in the Address field, including the terminating NULL character at the end of the ASCII string (see the description of the Address field below). The length does not include the size of the AddressType or AddressLength fields.

Address contains the network address, formatted as an ASCII string. The string is NULL terminated. Bytes beyond the NULL character are random, and should not be used by any application. IP addresses must be expressed in the conventional dot notation (e.g., 134.134.21 1.49). Ethernet and token ring MAC addresses must be expressed as a hexadecimal ASCII string (with a leading "ox" hexadecimal modifier). The string is case-insensitive.

MCNSGetMasterMulticastAddr

```
UINT MCNSGetMasterMulticastAddr(  LPTADDR       lpTAddr,
                                  LPMCNSHADDR   lpMCNShAddr,
                                  HTASK         hOwner,
                                  WORD          wFlags,
                                  LPVOID        Callback)
LPTADDR      lpTAddr;     // far pointer to a TADDR structure
LPMCNSHADDR  lpMCNShAddr; // far pointer to an MCNSHADDR structure
HTASK        hOwner;      // owner task handle
WORD         wFlags;      // option flags
LPVOID       Callback;    // window handle or far pointer to callback function
```

The MCNSGetMasterMulticastAddr function will attempt to allocate a multicast address in Master mode. The call consists of a synchronous and asynchronous part. The synchronous part returns with a status, as defined below. When the asynchronous part completes, it informs the user via a callback. If successful, the function returns to the user the allocated multicast address and an associated handle.

Parameters:

lpTAddr

Far pointer to a TADDR structure. The parameter lpTAddr is used as both an input and output.

If the MCNS_ANY_ADDR option is specified (see wFlags parameter below), then only the AddressType field of the lpTAddr need be set to indicate the desired network stack. If MCNS_SUGGEST_ADDR or MCNS_USE_ADDR is specified, the entire contents of lpTAddr must be filled in by the caller prior to the call. If MCNS_ANY_ADDR or MCNS_SUGGEST_ADDR is specified and the allocation attempt is successful, the contents of lpTAddr will be filled in by the nameserver during the asynchronous part of the call.

lpMCNSliAddr

Far pointer to an address handle. If the allocation attempt is successful, the contents of lpMCNShAddr will be filled in by the nameserver during the asynchronous part of the call. This handle may then be used in subsequent calls to MCNSReleaseMulticastAddr, MCNSAddOwner and MCNSRemoveOwner, and may be used in conjunction with the contents of lpTAddr by applications running on other nodes in calls to MCNSGetSlaveMulticastAddr.

hOwner

Initial owner of the address, specified as a Windows task handle. If the call is made at task time (i.e., not at interrupt time), hOwner may be specified as NULL, in which case the current task is used as the initial owner. If the call is made at interrupt time, hOwner is explicitly specified (NULL is not allowed). Ownership may subsequently be changed using the MCNSAddOwner and MCNSRemoveOwner calls.

wFlags

Bit map which allows the specification of three options:

1. Initial address attempt:

This specifies how an address is selected for an allocation attempt. MCNS_ANY_ADDR The nameserver will initially attempt to allocate a multicast address whose value is derived from the node's unicast address. The method of derivation is not documented. This method is likely to generate a unique (unallocated) address on the first attempt. If this attempt fails, the nameserver will then attempt to allocate other addresses within the allowable range, as defined in MCNSERVE.INI.

MCNS_SUGGEST_ADDR

The nameserver will first attempt to allocate the address specified by lpTAddr. If this fails, the nameserver will then attempt to allocate other addresses from the allowable range, as defined in MCNSERVE.INI. An application may wish to specify an initial address attempt by specifying an address derived from its unicast address. If all applications use this rule, assuming one such application per node, it is likely that the initial allocation attempt will succeed without having to attempt allocation of other addresses from the allowable range.

MCNS_USE_ADDR

The nameserver will attempt to allocate the address specified by lpTAddr. If this fails, no further address allocation will be attempted, and the nameserver will return MCNS_NOT_AVAIL.

If none of the initial address attempt flags are specified, the MCNS_ANY_ADDR flag will be assumed.

2. Callback type:

This specifies the type of user callback mechanism to be used when the asynchronous part of the call completes.

MCNS_CALL_FUNCTION

The nameserver will invoke the user-specified callback function specified by the Callback parameter. The callback function must have the following format:

FuncName(HWND hWnd, UINT wMsg, WPARAM wParam, LPARAM lParam).

MCNS_CALL_WINDOW

The nameserver will post a message to the user-specified callback window specified by the Callback parameter.

For either callback type, the callback parameters will have the following values:

hWnd For a callback function, this will be zero. For a callback window, this will be the window handle to which the message was posted. wMsg MCNS_GET_MULTICAST_ADDR.

wParam Status, as defined by the return values above.

lParam Equal to lpMCNShAddr used in the call to MCNS-GetMasterMulticastAddr. If multiple outstanding Gets are in progress, this parameter can be used to match the callback with an instance of a Get call.

3. Service provider:

Specifies which network service provider to use for address allocation. MCNS_PII_PROVIDER PII will be used to negotiate address allocation. MCNS_DLM_PROVIDER DLM will be used to negotiate address allocation.

Callback

User-specified callback location; either a valid Window handle or far pointer to callback function, as specified in the wFlags parameter.

Return Value: MCNS_OK

When returned with the synchronous part of the call, this indicates that the allocation request was successfully initiated. When returned with the asynchronous part of the call, this indicates that a multicast address was successfully allocated and returned in lpTAddr.

MCNS_ADDR_NOT_AVAIL

One of the following occurred: (1) wFlags specified MCNS_USE_ADDR and the requested address is already in use; (2) wFlags specified MCNS_USE_ADDR and the requested address is outside of the range of allowable addresses, as defined in MCNSERVE.INI; or (3) all multicast addresses in the allowable range are in use.

MCNS_BAD_PARAM

One or more of the following has occurred: (1) lpTAddr is NULL; (2) lpTAddr points to a structure whose contents are improperly formatted (illegal AddressType, incorrect AddressLength for the specified AddressType, invalid Address field contents); (3) lpMCNShAddr is NULL; (4) hOwner is non-NULL and is not a valid task handle; (5) hOwner is NULL and interrupts are disabled; (6) wFlags specifies a callback function and Callback is NULL; and/or (7) wFlags specifies a window callback and Callback is not a valid window handle.

MCNS_NO_MEM

There was insufficient memory to complete the request. Nameserver memory is increased by adjusting the MemorySize parameter in MCNSERVE.INI.

MCNS_STACK_NOT_AVAIL

Either (1) the AddressType specified in lpTAddr is not supported by this nameserver, or (2) wFlags specified a service provider which is not running on this machine.

MCNS_NO_NETWORK

Either (1) the nameserver was unable to initialize any network stacks specified as enabled in MCNSERVE.INI, or (2) no network stacks were enabled in MCNSERVE.INI.

MCNS_INTERNAL_ERROR

An internal error occurred during the function call.

The MCNSGetMasterMulticastAddr function will attempt to allocate a unique multicast address by interacting with other nameservers to locate an address not currently allocated. If successful, the allocated address is guaranteed to be unique among all nameservers on the network. Until the allocated address is released (see MCNSReleaseMulticastAddr), other nameservers will only be able to allocate the same address in Slave mode (see MCNSGetSlaveMulticastAddr).

Generally, one member of a group of nodes will call MCNSGetMasterMulticastAddr to obtain a multicast address and associated handle. That member will then pass the multicast address and handle on to other members of the group, who will call MCNSGetSlaveMulticastAddr using this (lpTAddr, lpMCNShAddr) pair.

MCNSGetMasterMulticastAddr allocates an address asynchronously. It will return immediately with a synchronous status. If the synchronous part of the call succeeds, the asynchronous part of the call will proceed, and the user-specified callback will be invoked when it completes. The callback occurs at task time; therefore, callback function code and referenced data need not be page-locked. If the synchronous status is anything other than MCNS_OK, the asynchronous part of the call will not proceed, and the user-specified callback will not be invoked.

Each allocated address has one or more owners associated with it, where an owner is defined as a Windows task. Owners may be added or removed from an address's ownership list using MCNSAddOwner or MCNSRemoveOwner. The nameserver periodically validates all address owners. If an invalid owner is found (e.g., if the Windows task has terminated), the owner is removed from the ownership list. If an address's ownership list becomes empty, the address is implicitly released.

MCNSGetMasterMulticastAddr is callable at interrupt time. The memory referenced by lpTAddr and lpMCNShAddr need not be page-locked.

When an application is done using an allocated address, it should return the address to the pool using the MCNSReleaseMulticastAddr call.

MCNSGetSlaveMulticastAddr

UINT MCNSGetSlaveMulticastAddr( LPTADDR lpTAddr, LPMCNSHADDR lpMCNShAddr, HTASK hOwner, WORD wFlags, LPVOID Callback) LPTADDR lpTAddr;//far pointer to a TADDR structure LPMCNSHADDR lpMCNShAddr;//far pointer to an MCNSHADDR structure HTASK hOwner;//owner task handle WORD wFlags;//option flags LPVOID Callback;//window handle or far pointer to callback function The MCNSGetSlaveMulticastAddr function will attempt to allocate the specified multicast address in Slave mode. The call consists of a synchronous and asynchronous part. The synchronous part returns with a status, as defined below. When the asynchronous part completes, it informs the user via a callback.

Parameters:

lpTAddr

Far pointer to a TADDR structure containing the address to be allocated. The address and handle pair referenced by lpTAddr and lpMCNShAddr must have been previously obtained from a call to MCNSGetMasterMulticastAddr (performed by an application on a different node).

lpMCNShAddr Far pointer to an address handle. The address and handle pair referenced by lpTAddr and lpMCNShAddr must have been previously obtained from a call to MCNSGetSlaveMulticastAddr (performed by an application on a different node). hOwner Initial owner of the address, specified as a Windows task handle. If the call is made at task time (i.e., not at interrupt time), hOwner may be specified as NULL, in which case the current task is used as the initial owner. If the call is made at interrupt time, hOwner is explicitly specified (NULL is not allowed). Ownership may subsequently be changed using the MCNSAddOwner and MCNSRemoveOwner calls.

wFlags

Bit map which allows the specification of two options:
1. Callback type:
   This specifies the type of user callback mechanism to be used when the asynchronous part of the call completes.
MCNS_CALL_FUNCTION
   The nameserver will invoke the user-specified callback function specified by the Callback parameter. The callback function has the following format:
   FuncName(HWND hWnd, UINT wMsg, WPARAM wParam, LPARAM lParam).
MCNS_CALL_WINDOW
   The nameserver will post a message to the user-specified callback window specified by the Callback parameter.

For either callback type, the callback parameters will have the following values:

hWnd For a callback function, this will be zero. For a callback window, this will be the window handle to which the message was posted.

wMsg MCNS_GET MULTICAST_ADDR.

wParam Status, as defined by the return values above.

lParam Equal to lpMCNShAddr used in the call to MCNSGetMasterMulticastAddr. If multiple outstanding Gets are in progress, this parameter can be used to match the callback with an instance of a Get call.

2. Service provider:

Specifies which network service provider to use for address allocation.

MCNS_PII_PROVIDER PII will be used to negotiate address allocation.

MCNS_DLM_PROVIDER DLM will be used to negotiate address allocation.

Callback

User-specified callback location; either a valid Window handle or far pointer to callback function, as specified in the wFlags parameter.

Return Value:

MCNS_OK

When returned with the synchronous part of the call, this indicates that the allocation request was successfully initiated. When returned with the asynchronous part of the call, this indicates that the multicast address was successfully allocated.

MCNS_NO_PEER

There are no peers that have this address allocated with the specified handle.

MCNS_ADDR_NOT_AVAIL

The address specified by lpTAddr is allocated by a member of another group (i.e., allocated with a different handle).

MCNS_BAD_PARAM

One or more of the following has occurred: (1) lpTAddr is NULL; (2) lpTAddr points to a structure whose contents are improperly formatted (illegal AddressType, incorrect AddressLength for the specified AddressType, invalid Address field contents); (3) lpMCNShAddr is NULL; (4) hOwner is non-NULL and is not a valid task handle; (5) hOwner is NULL and interrupts are disabled; (6) wFlags specifies a callback function and Callback is NULL; and/or (7) wFlags specifies a window callback and Callback is not a valid window handle.

MCNS_NO_MEM

There was insufficient memory to complete the request. Nameserver memory be increased by adjusting the MemorySize parameter in MCNSERVE.INI.

MCNS_STACK_NOT_AVAIL

Either (1) the AddressType specified in lpTAddr is not supported by this nameserver, or (2) wFlags specified a service provider which is not running on this machine.

MCNS_NO_NETWORK

Either (1) the nameserver was unable to initialize any network stacks specified as enabled in MCNSERVE.INI, or (2) no network stacks were enabled in MCNSERVE.INI.

MCNS_INTERNAL_ERROR

An internal error occurred during the function call.

The MCNSGetSlaveMulticastAddr function will attempt to allocate the specified multicast address in Slave mode. Allocation will be successful if at least one other nameserver (either Master or Slave) has this address allocated with the same handle.

Generally, one member of a group of nodes will call MCNSGetMasterMulticastAddr to obtain a multicast address and associated handle. That member will then pass the multicast address and handle on to other members of the group, who will call MCNSGetSlaveMulticastAddr using the (lpTAddr, lpMCNShAddr) pair.

It is possible that the address requested in the MCNSGetSlaveMulticastAddr call may not be available, even though it was successfully allocated by another node via an MCNSGetMasterMulticastAddr call. This can occur if, after MCNSGetMasterMulticastAddr is completed but before a corresponding MCNSGetSlaveMulticastAddr call is made, the node which performed the Master Get released the address, crashes, or the nameserver is shut down. During this time, another node may successfully perform a Master Get and allocate the same multicast address (but with a different associated handle). A subsequent Slave Get using the original handle will then fail with an MCNS_ADDR_NOT_AVAIL, error.

MCNSGetSlaveMulticastAddr allocates an address asynchronously. It will return immediately with a synchronous status. If the synchronous part of the call succeeds, the asynchronous part of the call will proceed, and the user-specified callback will be invoked when it completes. The callback occurs at task the; therefore, callback function code and referenced data need not be page-locked. If the synchronous status is anything other than MCNS_OK, the asynchronous part of the call will not proceed, and the user-specified callback will not be invoked.

Each allocated address has one or more owners associated with it, where an owner is defined as a Windows task. Owners may be added or removed from an address's ownership list using MCNSAddOwner or MCNSRemoveOwner. The nameserver periodically validates all address owners. If an invalid owner is found (e.g., if the Windows task has terminated), the owner is removed from the ownership list. If an address's ownership list becomes empty, the address is implicitly released.

MCNSGetSlaveMulticastAddr is callable at interrupt time. The memory referenced by lpTAddr and lpMCNShAddr need not be page-locked.

When an application is done using an allocated address, it should return the address to the pool using the MCNSReleaseMulticastAddr call.

MCNSReleaseMulticastAddr

UINT MCNSReleaseMulticastAddr( LPMCNSHADDR lpMCNShAddr) LPMCNSHADDR lpMCNShAddr, //far pointer to the handle of address to be released The MCNSReleaseMulticastAddr function will release a previously allocated multicast address.

Parameters:

lpMCNShAddr

Far pointer to a multicast address handle previously allocated by MCNSGetMasterMulticastAddr or MCNSGetSlaveMulticastAddr.

Return Value:

MCNS_OK

The address associated with lpMCNShAddr was successfully released.

MCNS_BAD_HANDLE

There is no address allocated with the specified handle.

MCNS_INTERNAL_ERROR

An internal error occurred during the function call.

The MCNSReleaseMulticastAddr call is synchronous. This function should be called when the application is done using the multicast address.

MCNSReleaseMulticastAddr may not be called before allocation of the associated address is complete. The function is callable at interrupt time, but in this case the memory referenced by lpMCNShAddr must be page locked.

MCNSAddOwner

UINT MCNSAddOwner( LPMCNSHADDR lpMCNShAddr, HTASK hNewOwner)
LPMCNSHADDR lpMCNShAddr;//far pointer to the handle of address whose ownership is to be changed.
HTASK hNewOwner;//handle of task to be added to the addresses ownership list.

The MCNSAddOwner call will add hNewOwner to the ownership list of the address associated with lpMCNShAddr.
Parameters:
lpMCNShAddr
Far pointer to the handle of the address whose ownership is to be changed.
hNewOwner
Handle of the task which is to be added to the ownership list. If the call is made at task time (i.e., interrupts are not disabled), hNewOwner may be specified as NULL, in which case the current task is used as the new owner. If the call is made at interrupt time hNewOwner must explicitly be specified (NULL, is not allowed).
Return Value:
MCNS_OK
The ownership of the address associated with lpMCNShAddr was successfully modified.
MCNS_BAD_PARAM
One of the following has occurred: (1) lpMCNShAddr is NULL; (2) hNewOwner is non-NULL and is not a valid task handle; or (3) hNewOwner is NULL and interrupts are disabled.
MCNS_BAD_HANDLE
There is no address allocated with the specified handle.
MCNS_DUP_OWNER
The owner specified by hNewOwner is already an owner of the address associated with lpMCNShAddr.
MCNS_NO_MEM
There was insufficient memory to complete the request. Nameserver memory may be increased by adjusting the MemorySize parameter in MCNSERVE.INI.
MCNS_INTERNAL_ERROR
An internal error occurred during the function call.
An address may have multiple owners.
The nameserver periodically verifies that all owners of an address are still valid (i.e. the owner's task has not terminated). If an invalid owner is discovered during this periodic check, that owner is removed from the ownership list. If the ownership list becomes empty, the address is automatically released.

MCNSAddOwner may not be called before allocation of the associated address is complete. The function is callable at interrupt time, but in this case the memory referenced by lpMCNShAddr must be page locked.

MCNSRemoveOwner

UINT MCNSRemoveOwner( LPMCNSHADDR lpMCNShAddr, HTASK hOldOwner, BOOL bReleaseAddr)
LPMCNSHADDR lpMCNShAddr; //far pointer to the handle of the address whose ownership is to be changed.
HTASK hOldOwner; //handle of task to be removed from ownership list.
BOOL bReleaseAddr; //release address if this is the last owner.

The MCNSRemoveOwner call will remove hOldOwner from the ownership list of the address associated with lpMCNShAddr.
Parameters:
lpMCNSHADDR
Far pointer to the handle of the address whose ownership is to be changed.
hOldOwner
Handle of task which is to be removed from ownership list. If the call is made at task time (i.e., interrupts are not disabled), hOldOwner may be specified as NULL, in which case the current task is used as the old owner. If the call is made at interrupt time, hOldOwner is explicitly specified (NULL is not allowed).
bReleaseAddr
Flag indicating whether to release the address if the last owner is being removed.
Return Value:
MCNS_OK
The ownership list of the address associated with lpMCNShAddr was successfully modified.
MCNS_BAD_PARAM
One of the following has occurred: (1) lpMCNShAddr is NULL; (2) hOldOwner is non-NULL and is not a valid task handle; or (3) hOldOwner is NULL and interrupts are disabled.
MCNS_BAD_HANDLE
There is no address allocated with the specified handle.
MCNS_NO_OLD_OWNER
The owner specified by hOldOwner is not an owner of the address associated with lpMCNShAddr.
MCNS_LAST_OWNER
hOldOwner is the only owner of the address, and bReleaseAddr is FALSE.
MCNS_INTERNAL_ERROR
An internal error occurred during the function call.
An owner may remove itself from an ownership list.
If bReleaseAddr is TRUE and the owner being removed is the last owner, an implicit MCNSReleaseMulticastAddr will be performed. If bReleaseAddr is FALSE and an attempt is made to remove the last owner, the call will fail with an MCNS_LAST_OWNER status. The owner will not be removed, and the address will not be released.

MCNSRemoveOwner may not be called before allocation of the associated address is complete. The function is callable at interrupt time, but in this case the memory referenced by lpMCNShAddr must be page locked.

MCNSERVE.INI Initialization File

This section describes the contents and default values of the nameserver initialization file MCNSERVE.INI. This file resides in the same directory from which MCNSERVE.DLL was loaded. The user may wish to modify parts of this file to suite their specific environment.
INI File Layout
The layout of MCNSERVE.INI is shown below; default values are shown:
[General]
MemorySize=4096
CleanupTimeout=5000
PiiPath=C:PIIPII.DLL
DlmPath=C:NAMESERVSERVERDLMDG.DLL
DlmIniPath=C:NAMESERVSERVERCNNATWRK.INI
[PII IP]
UseStack=1
ResolutionAddr=224.4.4.4
ResolutionPort=5000
AddressUpperLimit=239.255.255.255
AddressLowerLimit=232.128.0.0
RetryLimit=5

```
Timeout=500
MaxDelayLimit=500
MaxMinDelayLi-nit=100
WeakDelta=50
StrongDelta=100
[PII Ethernet MAC]UseStack=0
ResolutionAddr=01 AA00000 11
AddressUpperLimit=FFFFFFFFFFFF
AddressLowerLirnit=800000000000
RetryLiinit=5
Timeout=500
MaxDelayLimit=500
MaxMinDelayLimit=100
WeakDelta=50
StrongDelta=100
[PII Token Ring MAC]
UseStack=0
ResolutionAddr=C00000000000
AddressUpperLimit=C00040000000
AddressLowerLimit=C00004000000
RetryLimit=5
Timeout=500
MaxDelayLimit=500
MaxMinDelayLimit=100
WeakDelta=50
StrongDelta=100
[DLM IP]
UseStack=1
ResolutionAddr=224.2.4.4
ResolutionPort=0
AddressUpperLimit=232.127.255.255
AddressLowerLimit=225.0.0.0
RetryLimit=5
Timeout=500
MaxDelayLimit=500
MaxMinDelayLimit=100
WeakDelta=50
StrongDelta=100
AddressType=8005
Dlmld=2
Mdmld=8
[DLM Ethernet MAC]
UseStack=1
ResolutionAddr=01AA00000010
ResolutionPort=0
AddressUpperLimit=7FFFFFFFFFFF
AddressLowerLimit=000000000000
RetryLimit=5
Timeout=500
MaxDelayLimit=500
MaxMinDelayLimit=100
WeakDelta=50
StrongDelta=100
AddressType=8001
Dlmld=2
Mdmld=4
[DLM Token Ring MAC]
UseStack=0
ResolutionAddr C00000080000
ResolutionPort=0
AddressUpperLimit=C00002000000
AddressLowerLimit=C00000200000
RetryLimit=5
Timeout=500
MaxDelayLimit=500
MaxMinDelayLimit=100
WeakDelta=50
StrongDelta=100
AddressType=8001
Dlmld=2
Mdmld=4
```

System-Wide INI File Parameters

The following parameters apply globally to the nameserver (i.e., they are independent of which network stack(s) is/are used). The section name containing these parameters is [General].

MemorySize is the size (in bytes) of the dynamic allocation pool. If MCNS_NO_MEM errors are encountered during nameserver calls, this value may be increased. Note, however, that this memory is page-locked.

CleanupTimeout is the interval (in milliseconds) at which owner validation (aging) will be performed. This timer is also used to trigger a nameserver reference Count examination. If the nameserver (MCNSERVE.DLL) reference count drops to one (i.e., the only reference in MCNSERVE.EXE), the nameserver will terminate itself.

PiiPath is the pathname from which PII will be loaded. This applies only if one or more of the PII-related UseStack parameters (see below) are set to 1.

DlmPath is the pathname from which DLM will be loaded. This applies only if one or more of the DLM-related UseStack parameters (see below) are set to 1.

DlmIniPath specifies the pathname of the DLM INI file. This applies only if one or more of the DLM-related UseStack parameters (see below) are set to 1. This pathname will be passed to DLM as a parameter in the DLM_BeginSession call.

Stack-Specific INI File Parameters

For each network stack supported by the nameserver, a separate INI file section exists. Defined section names are as follows:

[PII IP] PII-based IP multicast addresses.
[PII Ethernet MAC] PII-based Ethernet MAC multicast addresses; currently not supported.
[PII Token Ring MAC] PII-based token ring MAC multicast addresses; currently not supported.
[DLM IP] DLM-based IP multicast addresses.
[DLM Ethernet MAC] DLM-based Ethernet MAC multicast addresses.
[DLM Token Ring MAC] DLM-based token ring MAC multicast addresses; currently not supported.

For each section, the following INI file parameters are defined:

UseStack is used to enable (value=1) or disable (value=0) a particular network stack. If UseStack is 0 for a particular section, all other entries in that section are ignored. At least one network stack must be enabled for nameserver operation.

ResolutionAddr is the resolution multicast address AR to be used by the nameserver. For IP stacks, this field must be expressed in the conventional IP "dot" notation. For Ethernet and token ring stacks, this field must be expressed as a hexadecimal number.

ResolutionPort is the resolution port PR to be used by the nameserver. This port number must be expressed as a decimal number.

AddressUpperLimit is the upper bound from which multicast addresses may be allocated.

AddressLowerLimit is the lower bound from which multicast addresses may be allocated.

RetryLimit is the number of Address Request packets that the nameserver will issue before assuming success (in Master Get mode) or failure (in Slave Get mode).

Timeout is the time interval (in milliseconds) between successive Address Request packets.

MaxDelayLimit is the upper limit (in milliseconds) to which the Acknowledgment timer upper bound may be increased.

MinMaxDelayLimit is the lower limit (in milliseconds) to which the Acknowledgment upper bound timer may be decreased.

Max is the upper limit (in milliseconds) to which the Acknowledgment timer lower bound may be increased.

WeakDelta is the time (in milliseconds) by which to weakly increase the Acknowledgment timer bounds.

StrongDelta is the time (in milliseconds) by which to strongly increase the Acknowledgment timer bounds.

AddressType specifies the address type value to be used when opening a DLM session. This field is not used for PII stacks.

DlmId specifies the DLM ID value to be used when opening a DLM session. This field is not used for PII stacks.

MdmId specifies the MDM ID value to be used when opening a DLM session. This field is not used for PII stacks.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for allocating multicast addresses, comprising the steps of:
    (a) selecting a potential multicast address by a first node of a network;
    (b) transmitting by the first node an address request message on a reserved address of the network, wherein:
        the address request message identifies the potential multicast address as a requested multicast address;
        the address request message identifies a requested handle associated with the requested multicast address, wherein the requested handle comprises a unicast address for the first node and a unique value generated by the first node, whereby the requested handle is different from any other requested handle ever generated by any node of the network including the first node;
        one or more other nodes of the network monitor the reserved address for address request messages;
        at least one other node of the network transmits an acknowledgment message on the reserved address, if the requested multicast address is already allocated by the other node;
        the acknowledgment message identifies the requested multicast address as an already allocated multicast address; and
        the acknowledgment message identifies an already allocated handle associated with the already allocated multicast address;
    (c) monitoring the reserved address by the first node for the acknowledgment message; and
    (d) abandoning the requested multicast address by the first node, if the first node receives the acknowledgment message from at least one other node of the network.

2. The process of claim 1, further comprising the step of:
    (e) allocating the requested multicast address as an allocated multicast address by the first node and performing multicast operations by the first node using the allocated multicast address, if the first node fails to receive the acknowledgment message.

3. The process of claim 2, wherein steps (b) and (c) are implemented two or more times before step (e) is implemented.

4. The process of claim 2, wherein step (e) further comprises the steps of:
    (1) monitoring the reserved address by the first node for subsequent address request messages from other nodes requesting the allocated multicast address; and
    (2) transmitting an acknowledgment message by the first node on the reserved address, if the first node receives an address request message from another node requesting the allocated multicast address.

5. The process of claim 1, wherein:
    step (d) comprises the step of abandoning the requested multicast address by the first node, if the first node receives the acknowledgment message from at least one other node of the network, wherein:
        the already allocated multicast address identified in the acknowledgment message matches the requested multicast address; and
        the already allocated handle identified in the acknowledgment message fails to match the requested handle; and further comprising the steps of:
    (e) abandoning the requested multicast address by the first node, if the first node fails to receive the acknowledgment message from at least one other node of the network; and
    (f) allocating the requested multicast address as an allocated multicast address by the first node and performing multicast operations by the first node using the allocated multicast address, if the first node receives the acknowledgment message, wherein:
        the already allocated multicast address identified in the acknowledgment message matches the requested multicast address; and
        the already allocated handle identified in the acknowledgment message matches the requested handle.

6. The process of claim 1, wherein no single node of the network is responsible for allocating multicast addresses for all other nodes.

7. The process of claim 1, wherein step (d) comprises the further steps of:
    (1) selecting a new potential multicast address by the first node; and
    (2) implementing steps (b)–(c) using the new potential multicast address as the requested multicast address.

8. The process of claim 1, wherein the network comprises one or more subnets, wherein each subnet has a reserved address used for address allocation resolution as implemented by steps (a)–(d).

9. The process of claim 8, wherein the reserved address for a first subnet is equal to the reserved address for a second subnet, if the scope of the first subnet does not intersect the scope of the second subnet.

10. The process of claim 1, wherein:
the address request message comprises the requested address, the requested handle, a unicast address for the first node, and a retry count; and
the acknowledgment message comprises the already allocated address and the already allocated handle.

11. The process of claim 1, wherein, when the first node receives an address request message from a second node of the network requesting a multicast address identical to the multicast address requested by the first node while the first node is waiting for an acknowledgment message in response to its address request message:
the first node abandons the requested multicast address, if the first node is operating in a master allocation mode, the second node is operating in the master allocation mode, and the unicast address of the first node is larger than the unicast address of the second node;
the first node reissues its address request message, if the first node is operating in the master allocation mode, the second node is operating in the master allocation mode, and the unicast address of the first node is smaller than the unicast address of the second node;
the first node abandons the requested multicast address, if the first node is operating in the master allocation mode and the second node is operating in a slave allocation mode;
the first node continues its processing unmodified, if the first node is operating in the slave allocation mode and the second node is operating in the master allocation mode; and
the first node continues its processing unmodified, if the first node is operating in the slave allocation mode and the second node is operating in the slave allocation mode.

12. The process of claim 1, wherein the first node transmits an address query to determine whether a multicast address is allocated by another node of the network.

13. An apparatus for allocating multicast addresses, comprising:
(a) means for selecting a potential multicast address by a first node of a network;
(b) means for transmitting by the first node an address request message on a reserved address of the network, wherein:
the address request message identifies the potential multicast address as a requested multicast address;
the address request message identifies a requested handle associated with the requested multicast address, wherein the requested handle comprises a unicast address for the first node and a unique value generated by the first node, whereby the requested handle is different from any other requested handle ever generated by any node of the network including the first node;
one or more other nodes of the network monitor the reserved address for address request messages;
at least one other node of the network transmits an acknowledgment message on the reserved address, if the requested multicast address is already allocated by the other node;
the acknowledgment message identifies the requested multicast address as an already allocated multicast address; and
the acknowledgment message identifies an already allocated handle associated with the already allocated multicast address;

(c) means for monitoring the reserved address by the first node for the acknowledgment message; and
(d) means for abandoning the requested multicast address by the first node, if the first node receives the acknowledgment message from at least one other node of the network.

14. The apparatus of claim 13, further comprising:
(e) means for allocating the requested multicast address as an allocated multicast address by the first node and performing multicast operations by the first node using the allocated multicast address, if the first node fails to receive the acknowledgment message.

15. The apparatus of claim 14, wherein the processing of means (b) and (c) is implemented two or more times before the processing of means (e) is implemented.

16. The apparatus of claim 14, wherein means (e):
(1) monitors the reserved address by the first node for subsequent address request messages from other nodes requesting the allocated multicast address; and
(2) transmits an acknowledgment message by the first node on the reserved address, if the first node receives an address request message from another node requesting the allocated multicast address.

17. The apparatus of claim 13, wherein:
means (d) abandons the requested multicast address by the first node, if the first node receives the acknowledgment message from at least one other node of the network, wherein:
the already allocated multicast address identified in the acknowledgment message matches the requested multicast address; and
the already allocated handle identified in the acknowledgment message fails to match the requested handle; and further comprising:
(e) means for abandoning the requested multicast address by the first node, if the first node fails to receive the acknowledgment message from at least one other node of the network; and
(f) means for allocating the requested multicast address as an allocated multicast address by the first node and performing multicast operations by the first node using the allocated multicast address, if the first node receives the acknowledgment message, wherein:
the already allocated multicast address identified in the acknowledgment message matches the requested multicast address; and
the already allocated handle identified in the acknowledgment message matches the requested handle.

18. The apparatus of claim 13, wherein no single node of the network is responsible for allocating multicast addresses for all other nodes.

19. The apparatus of claim 13, wherein means (d):
(1) selects a new potential multicast address by the first node; and
(2) implements the processing of means (b)–(c) using the new potential multicast address as the requested multicast address.

20. The apparatus of claim 13, wherein the network comprises one or more subnets, wherein each subnet has a reserved address used for address allocation resolution as implemented by means (a)–(d).

21. The apparatus of claim 20, wherein the reserved address for a first subnet is equal to the reserved address for a second subnet, if the scope of the first subnet does not intersect the scope of the second subnet.

22. The apparatus of claim 13, wherein:
the address request message comprises the requested address, the requested handle, a unicast address for the first node, and a retry count; and
the acknowledgment message comprises the already allocated address and the already allocated handle.

23. The apparatus of claim 13, wherein, when the first node receives an address request message from a second node of the network requesting a multicast address identical to the multicast address requested by the first node while the first node is waiting for an acknowledgment message in response to its address request message:
the first node abandons the requested multicast address, if the first node is operating in a master allocation mode, the second node is operating in the master allocation mode, and the unicast address of the first node is larger than the unicast address of the second node;
the first node reissues its address request message, if the first node is operating in the master allocation mode, the second node is operating in the master allocation mode, and the unicast address of the first node is smaller than the unicast address of the second node;
the first node abandons the requested multicast address, if the first node is operating in the master allocation mode and the second node is operating in a slave allocation mode;
the first node continues its processing unmodified, if the first node is operating in the slave allocation mode and the second node is operating in the master allocation mode; and
the first node continues its processing unmodified, if the first node is operating in the slave allocation mode and the second node is operating in the slave allocation mode.

24. The apparatus of claim 13, wherein the first node transmits an address query to determine whether a multicast address is allocated by another node of the network.

25. A storage medium encoded with machine-readable computer program code for allocating multicast addresses, comprising:
(a) means for causing a computer to select a potential multicast address by a first node of a network;
(b) means for causing the computer to transmit by the first node an address request message on a reserved address of the network, wherein:
the address request message identifies the potential multicast address as a requested multicast address;
the address request message identifies a requested handle associated with the requested multicast address, wherein the requested handle comprises a unicast address for the first node and a unique value generated by the first node, whereby the requested handle is different from any other requested handle ever generated by any node of the network including the first node;
one or more other nodes of the network monitor the reserved address for address request messages;
at least one other node of the network transmits an acknowledgment message on the reserved address, if the requested multicast address is already allocated by the other node;
the acknowledgment message identifies the requested multicast address as an already allocated multicast address; and
the acknowledgment message identifies an already allocated handle associated with the already allocated multicast address;

(c) means for causing the computer to monitor the reserved address by the first node for the acknowledgment message; and
(d) means for causing the computer to abandon the requested multicast address by the first node, if the first node receives the acknowledgment message from at least one other node of the network.

26. The storage medium of claim 25, further comprising:
(e) means for causing the computer to allocate the requested multicast address as an allocated multicast address by the first node and performing multicast operations by the first node using the allocated multicast address, if the first node fails to receive the acknowledgment message.

27. The storage medium of claim 26, wherein the processing of means (b) and (c) is implemented two or more times before the processing of means (e) is implemented.

28. The storage medium of claim 26, wherein means (e) causes the computer to:
(1) monitor the reserved address by the first node for subsequent address request messages from other nodes requesting the allocated multicast address; and
(2) transmit an acknowledgment message by the first node on the reserved address, if the first node receives an address request message from another node requesting the allocated multicast address.

29. The storage medium of claim 25, wherein:
means (d) causes the computer to abandon the requested multicast address by the first node, if the first node receives the acknowledgment message from at least one other node of the network, wherein:
the already allocated multicast address identified in the acknowledgment message matches the requested multicast address; and
the already allocated handle identified in the acknowledgment message fails to match the requested handle; and further comprising:
(e) means for causing the computer to abandon the requested multicast address by the first node, if the first node fails to receive the acknowledgment message from at least one other node of the network; and
(f) means for causing the computer to allocate the requested multicast address as an allocated multicast address by the first node and performing multicast operations by the first node using the allocated multicast address, if the first node receives the acknowledgment message, wherein:
the already allocated multicast address identified in the acknowledgment message matches the requested multicast address; and
the already allocated handle identified in the acknowledgment message matches the requested handle.

30. The storage medium of claim 25, wherein no single node of the network is responsible for allocating multicast addresses for all other nodes.

31. The storage medium of claim 25, wherein means (d) causes the computer to:
(1) select a new potential multicast address by the first node; and
(2) implement the processing of means (b)–(c) using the new potential multicast address as the requested multicast address.

32. The storage medium of claim 25, wherein the network comprises one or more subnets, wherein each subnet has a reserved address used for address allocation resolution as implemented by means (a)–(d).

33. The storage medium of claim 32, wherein the reserved address for a first subnet is equal to the reserved address for a second subnet, if the scope of the first subnet does not intersect the scope of the second subnet.

34. The storage medium of claim 25, wherein:

the address request message comprises the requested address, the requested handle, a unicast address for the first node, and a retry count; and the acknowledgment message comprises the already allocated address and the already allocated handle.

35. The storage medium of claim 25, wherein, when the first node receives an address request message from a second node of the network requesting a multicast address identical to the multicast address requested by the first node while the first node is waiting for an acknowledgment message in response to its address request message:

the first node abandons the requested multicast address, if the first node is operating in a master allocation mode, the second node is operating in the master allocation mode, and the unicast address of the first node is larger than the unicast address of the second node;

the first node reissues its address request message, if the first node is operating in the master allocation mode, the second node is operating in the master allocation mode, and the unicast address of the first node is smaller than the unicast address of the second node;

the first node abandons the requested multicast address, if the first node is operating in the master allocation mode and the second node is operating in a slave allocation mode;

the first node continues its processing unmodified, if the first node is operating in the slave allocation mode and the second node is operating in the master allocation mode; and the first node continues its processing unmodified, if the first node is operating in the slave allocation mode and the second node is operating in the slave allocation mode.

36. The storage medium of claim 25, wherein the first node transmits an address query to determine whether a multicast address is allocated by another node of the network.

* * * * *